United States Patent
Yin et al.

(10) Patent No.: US 11,641,457 B2
(45) Date of Patent: May 2, 2023

(54) METHOD FOR HIGH-PRECISION TRUE COLOR THREE-DIMENSIONAL RECONSTRUCTION OF A MECHANICAL COMPONENT

(71) Applicant: UNIVERSITY OF ELECTRONIC SCIENCE AND TECHNOLOGY OF CHINA, Sichuan (CN)

(72) Inventors: Chun Yin, Chengdu (CN); Yuhua Cheng, Chengdu (CN); Zeqi Wang, Chengdu (CN); Xutong Tan, Chengdu (CN); Kai Chen, Chengdu (CN); Gen Qiu, Chengdu (CN); Jianhao Luo, Chengdu (CN); Junjie Liu, Chengdu (CN); Zhibo Li, Chengdu (CN); Aolin Yang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 17/680,390

(22) Filed: Feb. 25, 2022

(65) Prior Publication Data
US 2022/0182593 A1    Jun. 9, 2022

(30) Foreign Application Priority Data
Jan. 28, 2022   (CN) .......................... 202210106295.5

(51) Int. Cl.
*H04N 13/15*   (2018.01)
*H04N 13/239*  (2018.01)
(Continued)

(52) U.S. Cl.
CPC ............... *H04N 13/15* (2018.05); *G06T 7/33* (2017.01); *H04N 13/239* (2018.05);
(Continued)

(58) Field of Classification Search
CPC ..................................................... H04N 13/15
(Continued)

(56) References Cited

U.S. PATENT DOCUMENTS 10,084,971 B2   9/2018   Liu et al.
11,210,803 B2   12/2021  Ye et al.

*Primary Examiner* — Nguyen T Truong
(74) *Attorney, Agent, or Firm* — Oliff PLC

(57) ABSTRACT

A method for high-precision true color three dimensional reconstruction of mechanical component. Firstly performs image acquisition: the left and right high-resolution gray-scale cameras are fixed at same height and spaced at certain distance, an optical transmitter fixed between the two gray-scale cameras, and low-resolution color camera fixed above optical transmitter, thus images of measured high-precision mechanical component are shot. Then performs image processing: all images are transmitted to a computer, which uses image processing to record surface information of measured high-precision mechanical component in the point cloud by high-precision true color three-dimensional reconstruction, which reflects color texture information of the surface, so as to realize the non-contact high-precision true color three dimensional reconstruction of high-precision mechanical component. The method uses binocular high-precision grayscale cameras instead of binocular color cameras, which broadens the range of capture wavelengths, retains richer texture details of high-precision mechanical component and improves accuracy of measurement.

1 Claim, 4 Drawing Sheets

(51) Int. Cl.
*H04N 13/254* (2018.01)
*G06T 7/33* (2017.01)
*H04N 13/246* (2018.01)

(52) U.S. Cl.
CPC ......... *H04N 13/246* (2018.05); *H04N 13/254* (2018.05); *G06T 2207/10024* (2013.01); *G06T 2207/20221* (2013.01)

(58) Field of Classification Search
USPC .......................................................... 348/43
See application file for complete search history.

METHOD FOR HIGH-PRECISION TRUE COLOR THREE-DIMENSIONAL RECONSTRUCTION OF A MECHANICAL COMPONENT

FIELD OF THE INVENTION

This application claims priorities under the Paris Convention to Chinese Patent Application No. 202210106295.5, filed on Jan. 28, 2022, the entirety of which is hereby incorporated by reference for all purposes as if fully set forth herein.

The present invention relates to the field of Three Dimensional (3D) reconstruction, more particularly to a method for high-precision true color three dimensional reconstruction of a mechanical component.

BACKGROUND OF THE INVENTION

In technical fields such as aviation, aerospace and deep-sea exploration, the structures of some key high-precision mechanical components are becoming more and more complex. For those of high-precision mechanical components, high-precision should be guaranteed in the process of manufacturing, otherwise when in use, they will threaten the normal operation of other mechanical components and reduce the life of system, and even make it failed to realize the system function, which may lead to catastrophic consequences. Therefore, in the process of manufacturing high-precision mechanical components, in order to guarantee that they meet the high-precision design requirements, it is necessary to perform high-precision measurements on the high-precision mechanical components to detect the surface texture and verify whether they meet the accuracy requirements of the design. The high-precision measurements pose a higher challenge to the accuracy of the measuring instrument itself.

The traditional binocular structured light system is relatively mature and can realize the high-precision 3D point cloud reconstruction of a target object. It is widely used in the high-precision measurements of the high-precision mechanical components of various equipments, such as military satellite and aerospace aircraft, in which it has achieved very good results. However, for the traditional structured light binocular 3D reconstruction method, high measurement accuracy can be obtained by combing a pair of grayscale cameras with coded structured light. But only the geometric texture of a target object can be reconstructed by inversely calculating the depth information through the monochromatic coded light. In some application scenarios, it is necessary to interactively apply the generated 3D point space data and color to generate real color point cloud data, which realizes the fusion of color information and position information, truly restores the surface information of a mechanical component, greatly enriches the surface features of the mechanical component and can be more effectively applied to the subsequent steps, such as feature recognition, target acquisition and separation.

In prior art, it is based on color-coded fringe light and binocular color cameras to solve the problem of true color 3D reconstruction. On the one hand, considering that the current high-resolution color cameras are expensive, the introduction of color cameras and color raster projectors greatly increases the construction cost of the system; On the other hand, processing the multi-channel information of the color cameras will greatly increase the computation cost and reduce the system efficiency. In addition, compared with grayscale camera, color camera only receive photons in three bands of red, green and blue, and the neighborhood average operation is used for demosaicing during the imaging process, resulting in the loss of a large number of image details. The original color information on the surface of the target object will also interfere with the color-coded information of the color-coded structured light, which greatly limits the measurement accuracy. Generally speaking, the true color 3D reconstruction system in prior art has high detection cost, and the large amount of computation leads to slow measurement speed, and it is difficult to realize high-precision true color 3D point cloud reconstruction.

In order to realize the full-scale reconstruction of a mechanical component, it is necessary to stitch the reconstructed information of all poses. The traditional point cloud registration algorithms are roughly divided into two categories: method based on point-to-point distance minimization and method based on point-to-plane distance minimization. The traditional point-to-point distance minimization method used in accurate point cloud registration has a high computation cost, and the volume of high-precision point cloud reconstruction data is large, resulting in a long convergence time of the algorithm, and the convergence is not as good as the point-to-plane distance minimization method. Down sampling or key point extraction before point cloud stitching can greatly reduce the number of points involved in the operation and shorten the system calculation time. Although using the point-to-plane distance minimization method after key point extraction can guarantee the convergence speed, the point-to-plane distance minimization method is affected by the error of the point's normal vector estimation, resulting the accuracy is not as high as that of the point-to-point distance minimization method. Therefore, a combination of point-to-plane distance minimization method and point-to-point distance minimization method can be considered to ensure fast convergence and the accuracy of high-precision point cloud stitching.

At the same time, in order to give color information to high-precision point cloud data, it is necessary to fuse the real color information of the surface of a mechanical component under the premise of ensuring data accuracy, which involves the fusion of high-resolution grayscale image and low-resolution color image. Common image fusion method assumes that the source images and the target images have the same resolution, or a relationship of scaling in the same proportion. However, in practical applications, the resolutions of the multi-source images to be fused do not always appear in the form of equal or equal proportions.

SUMMARY OF THE INVENTION

The present invention aims to overcome the deficiencies of the prior art, and provides a method for high-precision true color three dimensional reconstruction of a mechanical component, so as to realize a non-contact high-precision measurement of key high-precision component in the aerospace and other fields, at the same time, to improve the existing point cloud stitching method and solve the problem of arbitrary resolution image fusion, guarantee the measurement accuracy of the system, and improve the measurement speed of the system.

To achieve these objectives, in accordance with the present invention, a method for high-precision true color three dimensional reconstruction of a mechanical component is provided, comprising:

(1). image acquisition 1.1). fixing a left high-resolution grayscale camera and a right high-resolution grayscale camera on a support device, where the right high-resolution grayscale camera and the left high-resolution grayscale camera are at the same height and spaced at a certain distance;

fixing an optical transmitter between the left high-resolution grayscale camera and right high-resolution grayscale camera and a low-resolution color camera above the optical transmitter;

1.2). adjusting the left high-resolution grayscale camera, the right high-resolution grayscale camera, the optical transmitter and the low-resolution color camera, so that a measured high-precision mechanical component can be completely and clearly captured by the cameras and the optical transmitter can completely and clearly project non-coded light and coded light on the surface of the measured high-precision mechanical component;

adjusting a calibration plate and using Zhang's calibration method to complete a camera calibration;

1.3). placing the measured high-precision mechanical component at a suitable position in the view of the cameras, then rotating the measured high-precision mechanical component in a fixed direction and acquiring images of J poses:

for the measured high-precision mechanical component of the $j^{th}$ pose, firstly the optical transmitter projects a non-coded light on the surface of the measured high-precision mechanical component, the low-resolution color camera takes image which is denoted by low-resolution color image $CI_j$, the left high-resolution grayscale camera takes an image which is denoted by left high-resolution grayscale image $LI_j$, then the optical transmitter projects N frames of encoded light on the surface of the measured high-precision mechanical component, the left high-resolution grayscale camera and right high-resolution grayscale camera respectively take a grayscale image which are respectively denoted by $\overline{LI}_{jn}$ and $\overline{RI}_{jn}$, n=1, 2, ..., N;

(2). image processing 2.1). reconstructing a three-dimensional point cloud of the measured high-precision mechanical component of each pose: based on the principle of binocular camera, reconstructing a three-dimensional point cloud $P_j$ of the $j^{th}$ pose by using the grayscale images $\overline{LI}_{j1}$, $\overline{LI}_{j2}$, ..., $\overline{LI}_{jN}$ and $\overline{RI}_{j1}$, $\overline{RI}_{j2}$, ..., $\overline{RI}_{jN}$ of the $j^{th}$ pose, where j=1, 2, ..., J;

2.2). performing registrations on 3D point clouds to calculate a rigid body transformation matrix $W_j$ by using the three-dimensional point cloud $P_j$ as a target point cloud and the three-dimensional point cloud $P_{j+1}$ of the $(j+1)^{th}$ pose as a source point cloud, where j=1, 2, ..., J−1:

2.2.1). respectively performing voxel down sampling on the target point cloud $P_j$ and the source point cloud $P_{j+1}$, where the voxel down sampled target point cloud is denoted by the target point cloud $P_{j\_down}$, and the voxel down sampled source point cloud is denoted by the source point cloud $P_{j+1\_down}$, and respectively performing 3D-SIFT key point extraction on the target point cloud $P_{j\_down}$ and the target point cloud $P_{j+1\_down}$, where the extracted target point cloud is denoted by a target point cloud $P_{j\_key}$, the extracted source point cloud is denoted by a source point cloud $P_{j+1\_key}$;

2.2.2). initializing iteration number k=1, setting a maximum iteration number $K_{c\_reg}$, setting an iteration number $K_{pp}$ which is used for shifting a point-to-plane error function to a point-to-point error function, initializing transformed source point cloud $P_{j+1\_key\_1}$ to the source point cloud $P_{j+1\_key}$;

2.2.3). for the $k^{th}$ iteration, to each point of the source point cloud $P_{j+1\_key\_k}$, finding the nearest point in the target point cloud $P_{j\_key}$ as its corresponding point by using KD tree to obtain a corresponding point-to-point set $C_{j+1\_key\_k}$, then removing the point and its nearest point whose distance is great than threshold Thres to obtain a optimized point-to-point set $C_{j\_key\_k}'$;

2.2.4). homogenizing the $i^{th}$ point $p_{j+1\_key\_ki}$ of the source point cloud $P_{j+1\_key\_k}$ in point-to-point set $C_{j\_key\_k}'$ to obtain its corresponding vector $\overline{p}_{j+1\_key\_ki}=(x_{j+1\_key\_ki}, y_{j+1\_key\_ki}, z_{j+1\_key\_ki}, 1)^T$, finding corresponding point $p_{j\_key\_i}$ of the target point cloud $P_{j\_key}$ in point-to-point set $C_{j\_key\_k}'$ and homogenizing it to obtain its corresponding vector $\overline{p}_{j\_key\_i}=(x_{j\_key\_i}, y_{j\_key\_i}, z_{j\_key\_i}, 1)^T$, where i=1, 2, ..., $N_{cj\_key\_k}$, $N_{cj\_key\_k}$ is the number of point-to-point set $C_{j\_key\_k}'$;

if iteration number k is less than $K_{pp}$, then constructing a point-to-plane error function $F_{jk}$ by using the distance from the point $p_{j+1\_key\_ki}$ to the tangent plane of point $p_{j\_key\_i}$ of target point cloud $P_{j\_key}$, where the error function $F_{jk}$ is:

$$F_{jk} = \sum_{i=1}^{N_{cj\_key\_k}} ((W_{jk} \cdot \overline{p}_{(j+1)\_key\_ki} - \overline{p}_{j\_key\_i}) \cdot n_{j\_key\_i})^2$$

where $n_{j\_key\_i}$ is the normal vector corresponding to point $p_{j\_key\_i}$, $W_{jk}$ is the transformation matrix of the $k^{th}$ iteration;

if iteration number k is nor less than $K_{pp}$, then constructing a point-to-point error function $F_{jk}$ according to the sum of the squares of the distances between the corresponding points, where the error function $F_{jk}$ is:

$$F_{jk} = \sum_{i=1}^{N_{cj\_key\_k}} \|W_{jk} \cdot \overline{p}_{(j+1)\_key\_ki} - \overline{p}_{j\_key\_i}\|^2;$$

2.2.5). calculating the transformation matrix $W_{jk}$ that makes the value of error function $F_{jk}$ minimum, and then applying a transformation to the source point cloud $P_{j+1\_key\_k}$ by using error function $F_{jk}$ to obtain a source point cloud $P_{j+1\_key\_(k+1)}$ and recording the value of error function $F_{jk}$ at the $k^{th}$ iteration;

2.2.6). judging whether the variation $|F_{jk}-F_{j(k-1)}|$ of the value of error function of two consecutive iterations is less than a threshold e or iteration number k reaches the maximum iteration number $K_{c\_reg}$;

if yes, then recording the point-to-point set $C_{j\_key\_k'}'$ at the $k'^{th}$ iteration, where k' is the iteration number when the judgment condition is met, and calculating the optimal rigid body transformation matrix $W_j=W_{jk'} W_{j(k'-1)} \ldots W_{j1}$, where the optimal rigid body transformation matrix $W_j$ is a matrix of 4×4, its formation is:

$$W_j = \begin{bmatrix} R_{cloud\_j} & T_{cloud\_j} \\ \vec{0} & 1 \end{bmatrix}$$

where $R^{cloud\_j}$ is a rotation matrix of 3×3 which registers the source point cloud $P_{j+1\_key}$ to the target point cloud $P_{j\_key}$, $T_{cloud\_j}$ is a translation vector of 1×3, $\vec{0}$ is a row vector of 3×1;

if no, k=k+1, and returning step 2.2.3);

2.3). fusing the left high-resolution image $LI_j$ with the low-resolution color image $CI_j$ of the $j^{th}$ pose, j=1, 2, ..., m 2.3.1). calculating a projection matrix $H_j$ for registering the low-resolution color image $CI_j$ to the left high-resolution image $LI_j$:

2.3.1.1). respectively extracting SURF feature points from the low-resolution color image $CI_j$ and the left high-resolution image $LI_j$, and taking the extracted SURF feature points as key points;

2.3.1.2). to each key point of the low-resolution color image $CI_j$, finding the closest key point and the next closest key point in the left high-resolution image $LI_j$ according to Euclidean distance, if the ratio of the distance of the closest key point to the distance of the next closet key point is less than a set threshold θ, then determining the closest key point in the left high-resolution image $LI_j$ as the matching point, thus a matching point pair set $C_{cl\_j}$ is obtained;

2.3.1.3). setting a maximum iteration number $K_{p\_reg}$ and an error threshold φ, initializing iteration number k=1, then optimizing the matching point pair set $C_{cl\_j}$ through random sampling consistency (RANSAC) algorithm to obtain the projection matrix $H_j$:

2.3.1.3.1). for the $k^{th}$ iteration in the process of optimizing the matching point pair set $C_{cl\_j}$, randomly selecting four point pairs, which are denoted respectively by $\{q_{cj\_1}, q_{lj\_1}\}$, $\{q_{cj\_2}, q_{lj\_2}\}$, $\{q_{cj\_3}, q_{lj\_3}\}$ and $\{q_{cj\_4}, q_{lj\_4}\}$, and homogenizing them to obtain four point pairs $\{\bar{q}_{cj\_1}, \bar{q}_{lj\_1}\}$, $\{\bar{q}_{cj\_2}, \bar{q}_{lj\_2}\}$, $\{\bar{q}_{cj\_3}, \bar{q}_{lj\_3}\}$ and $\{\bar{q}_{cj\_4}, \bar{q}_{lj\_4}\}$, then calculating a projection matrix $H_{jk}$ between the four point pairs, which satisfies the following relationship:

$\bar{q}_{lj\_i} = H_{jk} \cdot \bar{q}_{cj\_i}$, 1, 2, ..., 4

2.3.1.3.2). homogenizing a point pair $\{q_{cj\_i}, \bar{q}_{lj\_i}\}$ other than the selected four point pairs from the matching point pair set $C_{cl\_j}$ to obtain point pair $\{\bar{q}_{cj\_i}, \bar{q}_{lj\_i}\}$ then calculating a mapping error $\varepsilon_{jk\_i} = \|\bar{q}_{lj\_i}, H_{jk}\bar{q}_{cj\_i}\|$ according to the projection matrix $H_{jk}$, where i=5, 6, ..., $N_{cj}$, $N_{cj}$ is the number of point pairs of the matching point pair set $C_{cl\_j}$, and selecting the point pair which mapping error $\varepsilon_{jk\_i} < \varphi$ to form a interior point set $S_{jk}$;

2.3.1.3.3). if the last iteration has been performed, namely k=$K_{p\_reg}$, then comparing $S_{j1}, S_{j2}, ..., S_{jK_{p\_reg}}$ to select the projection matrix $H_{jk}$ as the projection matrix $H_j$ when the interior point set $S_{jk}$ is the largest, or k=k+1 and returning step 2.3.1.3.1;

2.3.2). registering the low-resolution color image $CI_j$ to the left high-resolution image $LI_j$ according to the projection matrix $H_j$ to obtain a high-resolution registered color image $CI_{j\_r}$:

2.3.2.1). creating a empty high-resolution registered color image $CI_{j\_r}$ which has the same size with the left high-resolution image $LI_j$, then performing coordinate transformation on the pixels of the low-resolution color image $CI_j$ to obtain a color image $CI_j'$;

2.3.2.2). determining the interpolation range: the pixel points of the high-resolution registered color image $CI_{j\_r}$ which are located on color image $CI_j'$ and other than the matching points in matching point pair set $C_{cl\_j}$ are the points which are needed to be interpolated, namely interpolation points;

2.3.2.3). using the bilinear interpolation method to interpolate the pixel values of all interpolation points: to the $i^{th}$ interpolation point $q_{cj\_r\_i}(x_{cj\_r\_i}, y_{cj\_r\_i})$, performing a inverse transformation according to the projection matrix $H_j$ to obtain a pixel point $\rho_{cj\_i}(x_{cj\_\rho\_i}, y_{cj\_\rho\_i})$ located on the low-resolution color image $CI_j'$, and finding four nearest pixel points which are denoted respectively by $p_{cj\_\rho\_i11}(x_{cj\_\rho\_i1}, y_{cj\_\rho\_i1})$, $P_{cj\_\rho\_i12}(x_{cj\_\rho\_i1}, y_{cj\_\rho\_i2})$, $p_{cj\_\rho\_i21}(x_{cj\_\rho\_i2}, y_{cj\_\rho\_i1})$ and $p_{cj\_\rho\_i22}(x_{cj\_\rho\_i2}, y_{cj\_\rho\_i2})$:

firstly interpolating in the x direction to obtain the following:

$$CI_j(x_{cj\_\rho\_i}, y_{cj\_\rho\_i1}) = \frac{x_{cj\_\rho\_i2} - x_{cj\_\rho\_i}}{x_{cj\_\rho\_i2} - x_{cj\_\rho\_i1}} CI_j(x_{cj\_\rho\_i1}, y_{cj\_\rho\_i1}) +$$

$$\frac{x_{cj\_\rho\_i} - x_{cj\_\rho\_i1}}{x_{cj\_\rho\_i2} - x_{cj\_\rho\_i1}} CI_j(x_{cj\_\rho\_i2}, y_{cj\_\rho\_i1})$$

$$CI_j(x_{cj\_\rho\_i}, y_{cj\_\rho\_i2}) = \frac{x_{cj\_\rho\_i2} - x_{cj\_\rho\_i}}{x_{cj\_\rho\_i2} - x_{cj\_\rho\_i1}} CI_j(x_{cj\_\rho\_i1}, y_{cj\_\rho\_i2}) +$$

$$\frac{x_{cj\_\rho\_i} - x_{cj\_\rho\_i1}}{x_{cj\_\rho\_i2} - x_{cj\_\rho\_i1}} CI_j(x_{cj\_\rho\_i2}, y_{cj\_\rho\_i2})$$

then interpolating in the y direction to obtain the following pixel value:

$$CI_j(x_{cj\_\rho\_i}, y_{cj\_\rho\_i}) = \text{Round}\left(\frac{y_{cj\_\rho\_i2} - y_{cj\_\rho\_i}}{y_{cj\_\rho\_i2} - y_{cj\_\rho\_i1}} CI_j(x_{cj\_\rho\_i}, y_{cj\_\rho\_i1}) + \right.$$

$$\left.\frac{y_{cj\_\rho\_i} - y_{cj\_\rho\_i1}}{y_{cj\_\rho\_i2} - y_{cj\_\rho\_i1}} CI_j(x_{cj\_\rho\_i}, y_{cj\_\rho\_i2})\right)$$

letting the pixel value $CI_{j\_r}(x_{cj\_r\_i}, y_{cj\_r\_i})$ of the interpolation point $q_{cj\_r\_i}(x_{cj\_r\_i}, y_{cj\_r\_i})$ be $CI_j'(x_{cj\_\rho\_i}, y_{cj\_\rho\_i})$;

2.3.2.4). to the pixel points of the high-resolution registered color image $CI_{j\_r}$ which are located on color image $CI_j'$ and are the matching points in matching point pair set $C_{cl\_j}$, directly using the pixel values of their corresponding matching point in the low-resolution color image $CI_j$ to assign; and to the pixel points of the high-resolution registered color image $CI_{j\_r}$ which are not located on color image $CI_j'$, directly using preset RGB value to assign, thus the high-resolution registered color image $CI_{j\_r}$ is obtained;

2.3.3). fusing the left high-resolution image $LI_j$ with the high-resolution registered color image $CI_{j\_r}$:

2.3.3.1). performing $N_l$-layer Laplacian pyramid decomposition on the left high-resolution image $LI_j$ to obtain $N_l$ layers of image $LI_{j\_w}$, performing $N_l$-layer Laplacian pyramid decomposition on each channel of the high-resolution registered color image $CI_{j\_r}$ to obtain $N_l$ layers of image $CI_{j\_rw}$ on R channel, $N_l$ layers of image $CI_{j\_gw}$ on G channel and $N_l$ layers of image $CI_{j\_bw}$ on B channel, where w=1, 2, ..., $N_l$ and represents the serial number of image;

2.3.3.2). respectively performing bilateral filter on the top-layer images $CI_{j\_rN_l}$, $CI_{j\_gN_l}$, $CI_{j\_bN_l}$ and $LI_{j\_N_l}$ to obtain top-layer images $CI_{j\_rN_l\_b}$, $CI_{j\_gN_l\_b}$, $CI_{j\_bN_l\_b}$ and $LI_{j\_N_l\_b}$;

2.3.3.3). to the top-layer images of three channels of the high-resolution registered color image $CI_{j\_r}$, calculating the difference before and after bilateral filtering to obtain detail layer images $CI_{j\_rN_l}' = CI_{j\_rN_l} - CI_{j\_rN_l\_b}$, $CI_{j\_gN_l}' = CI_{j\_gN_l} - CI_{j\_gN_l\_b}$ and $CI_{j\_bN_l}' = CI_{j\_bN_l} - CI_{j\_bN_l\_b}$, which have rich details of image;

2.3.3.4). performing Gaussian filter on the top-layer image of the left high-resolution image $LI_j$ to obtain a overall smooth image $LI_{j\_N_l\_g}$, then calculating the difference between the top-layer image $LI_{j\_N_l\_b}$ and the overall smooth image $LI_{j\_N_l\_g}$ to obtain a layer image $LI_{j\_N_l}'=LI_{j\_N_l\_b}-_{j\_N_l\_g}$ which has rich edge information;

2.3.3.5). calculating top-layer fusion images, where the top-layer fusion image of R channel is: $Fu_{j\_N_l\_r}=CI_{j\_rN_l}+\alpha CI_{j\_rN_l}'+\beta LI_{j\_N_l}'$, the top-layer fusion image of G channel is: $Fu_{j\_N_l\_g}=CI_{j\_gN_l}+\alpha CI_{j\_gN_l}'+\beta LI_{j\_N_l}'$, the top-layer fusion image of B channel is: $Fu_{j\_N_l\_r}=CI_{j\_rN_l}+\alpha CI_{j\_rN_l}'+\beta LI_{j\_N_l}'$;

2.3.3.6). to the layer fusion images other than the top-layer fusion images, for the reason of retaining the rich color information, assigning the layer fusion images of R channel according to equation $Fu=_{j\_w\_r}=CI_{j\_rw}$, the layer fusion images of G channel according to equation $Fu_{j\_w\_g}=CI_{j\_gw}$ and the layer fusion images of B channel according to equation $Fu_{j\_w\_b}=CI_{j\_bw}$, where w=1, 2, . . . , N−1;

2.3.3.7). based on all layer fusion images of each color channel, performing $N_l$-layer Laplacian pyramid composition to obtain fusion images of each color channel, thus the color fusion image of the $j^{th}$ pose is obtained and denoted by $Fu_j$;

2.4). reconstructing a color point cloud:

2.4.1). performing color reconstruction on point cloud of each pose to obtain color point clouds $\tilde{P}_1, \tilde{P}_2, \ldots, \tilde{P}_m$:

2.4.1.1). to each point $p_{ji}(x_{ji}, y_{ji}, z_{ji})$ of the three-dimensional point cloud $P_j$ of the measured high-precision mechanical component of the $j^{th}$ pose, performing a coordinate system conversion from three-dimensional point to pixel point:

$$Z_c \begin{bmatrix} a_{ji} \\ b_{ji} \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R_c & T_c \\ \vec{0} & 1 \end{bmatrix} \begin{bmatrix} x_{ji} \\ y_{ji} \\ z_{ji} \\ 1 \end{bmatrix}$$

where $z_c$ is a scale factor, $f_x$ and $f_y$ are respectively the focal lengths of camera in the x and y direction, $u_0$ and $v_0$ are respectively the coordinates of camera's main point on pixel plane, $R_c$ and $T_c$ are respectively the rotation matrix and the translation vector in camera calibration parameters, $(a_{ji}, b_{ji})$ are the coordinates of the pixel point $q_{ij}$ corresponding to the point $p_{ji}(x_{ji}, y_{ji}, z_{ji})$ of the three-dimensional point cloud $P_j$, i is the serial number of the point;

2.4.1.2). obtaining pixel value $R(a_{ji}, b_{ji})$ of R channel, pixel value $G(a_{ji}, b_{ji})$ of G channel and pixel value $B(a_{ji}, b_{ji})$ of B channel of pixel point at coordinates $(a_{ji}, b_{ji})$ on the color fusion image $Fu_j$, then assigning pixel values to the point $p_{ji}(x_{ji}, y_{ji}, z_{ji})$ of the three-dimensional point cloud $P_j$ according to the following equations: $R(x_{ji}, y_{ji}, z_{ji})=R(a_{ji}, b_{ji})$, $G(x_{ji}, y_{ji}, z_{ji})=G(a_{ji}, b_{ji})$ and $B(x_{ji}, y_{ji}, z_{ji})=B(a_{ji}, b_{ji})$ to obtain color point cloud $\tilde{P}_j$, j=1, 2, . . . , m, where $R(x_{ji}, y_{ji}, z_{ji})$, $G(x_{ji}, y_{ji}, z_{ji})$ and $B(x_{ji}, y_{ji}, z_{ji})$ are respectively the point values of R, G and B channel of point $p_{ji}(x_{ji}, y_{ji}, z_{ji})$ of color point cloud $\tilde{P}_j$;

2.4.2). registering the color point clouds of all poses:

based on the series of rigid body transformation matrices $W_1, W_2, \ldots, W_{m-1}$ which are obtained according to step 2.2, performing registration by respectively converting the color point clouds $\tilde{P}_2, \tilde{P}_3, \ldots, \tilde{P}_m$ to the coordinate system of the color point cloud $\tilde{P}_1$, where the color point clouds after conversion are respectively denoted by $\tilde{P}_2^*, \tilde{P}_3^*, \ldots, \tilde{P}_m^*$, there have:

$$\tilde{P}_2^* = W_1 \tilde{P}_2$$

$$\tilde{P}_3^* = W_1 W_2 \tilde{P}_3$$

$$\ldots$$

$$\tilde{P}_m^* = W_1 W_2 \ldots W_{m-1} \tilde{P}_m$$

2.4.3). fusing the overlapping part of the color point clouds:

setting $\tilde{G}_1^* = \tilde{P}_1^* = \tilde{P}_1$, then fusing the color point cloud $\tilde{P}_2^*$ with the color point cloud $\tilde{G}_1^*$ to obtain a color point cloud $\tilde{G}_2^*$ to j=2, 3, . . . m−1, successively fusing the color point cloud $\tilde{P}_{j+1}^*$ with the color point cloud $\tilde{G}_j^*$ to obtain a color point cloud $\tilde{G}_{j+1}^*$ and finally obtaining a fused overall color point cloud $\tilde{G}_m^*$ that the high-precision true color three dimensional reconstruction is complete;

where the fusion of the color point cloud $\tilde{P}_{j+1}^*$ and the color point cloud $\tilde{G}_j^*$ is:

to the matching point pair in the point-to-point set $C_{j\_key\_k}'$, directly taking it as a correspondence point pair and putting it into a correspondence point pair set $Co_j$;

to a non-matching point $\tilde{p}_{j+1\_i}^*(\tilde{x}_{j+1\_i}^*, \tilde{y}_{j+1\_i}^*, \tilde{z}_{j+1\_i}^*)$ of the color point cloud $\tilde{P}_{j+1}^*$, finding the nearest point in the color point cloud $\tilde{P}_{j+1}^*$ by using KD tree, and then calculating the average value σ of all distances between non-matching points and their respective nearest points; simultaneously, to each non-matching point of the color point cloud $\tilde{G}_j^*$, finding the nearest point in the color point cloud $\tilde{P}_{j+1}^*$ by using KD tree, if the distance of the nearest point is less than the average value σ, then the non-matching point of the color point cloud $\tilde{G}_j^*$ and its nearest point in the color point cloud $\tilde{P}_{j+1}^*$ are taken as a correspondence point pair and put into the correspondence point pair set $Co_j$;

weighting geometric coordinates of each correspondence point pair $\{\tilde{p}_{j+1\_i}^*(\tilde{x}_{j+1\_i}^*, \tilde{y}_{j+1\_i}^*, \tilde{z}_{j+1\_i}^*), \tilde{g}_{j\_i}^*(\tilde{x}_{j\_i}^*, \tilde{y}_{j\_i}^*, \tilde{z}_{j\_i}^*)\}$ in the correspondence point pair set $Co_j$ with the weights $\alpha_i$ and $\beta_i$ to obtain the coordinates of a fused point $\tilde{g}_{j+1\_i}^*$:

$$(\alpha_i \tilde{x}_{j+1\_i}^* + \beta_i \tilde{x}_{j\_i}^*, \alpha_i \tilde{y}_{j+1\_i}^* + \beta_i \tilde{y}_{j\_i}^*, \alpha_i \tilde{z}_{j+1\_i}^* + \beta_i \tilde{z}_{j\_i}^*)$$

respectively weighting the point values of R, G and B channel of each correspondence point pair $\{\tilde{p}_{j+1\_i}^*(\tilde{x}_{j+1\_i}^*, \tilde{y}_{j+1\_i}^*, \tilde{z}_{j+1\_i}^*), \tilde{g}_{j\_i}^*(\tilde{x}_{j\_i}^*, \tilde{y}_{j\_i}^*, \tilde{z}_{j\_i}^*)\}$ in the correspondence point pair set $Co_j$ with the weights $(\alpha_{ri}, \beta_{ri})$, $(\alpha_{gi}, \beta_{gi})$ and $(\alpha_{bi}, \beta_{bi})$ to obtain the point values $R(\tilde{g}_{j+1\_i}^*)$, $G(\tilde{g}_{j+1\_i}^*)$ and $B(\tilde{g}_{j+1\_i}^*)$ of R, G and B channel of the point $\tilde{g}_{j+1\_i}^*$ of the color point cloud $\tilde{G}_{j+1}^*$:

$$R(\tilde{g}_{j+1\_i}^*) = \alpha_{ri} R(\tilde{p}_{j+1\_i}^*) + \beta_{ri} R(\tilde{g}_{j\_i}^*)$$

$$G(\tilde{g}_{j+1\_i}^*) = \alpha_{gi} G(\tilde{p}_{j+1\_i}^*) + \beta_{gi} G(\tilde{g}_{j\_i}^*)$$

$$B(\tilde{g}_{j+1\_i}^*) = \alpha_{bi} B(\tilde{p}_{j+1\_i}^*) + \beta_{bi} B(\tilde{g}_{j\_i}^*)$$

where, i=1, 2, . . . , $N_{coj}$, $N_{coj}$ is the number of the correspondence point pairs, $R(\tilde{p}_{j+1\_i}^*)$, $G(\tilde{p}_{j+1\_i}^*)$ and $(\tilde{p}_{j+1\_i}^*)$ are respectively the point values of R, G and B channel of the point $\tilde{p}_{j+1\_i}^*$, $R(\tilde{g}_{j\_i}^*)$, $G(\tilde{g}_{j\_i}^*)$ and $B(\tilde{g}_{j\_i}^*)$ are respectively the point values of R, G and B channel of the point $\tilde{g}_{j\_i}^*$ of the color point cloud $\tilde{G}_{j+1}^*$.

The objectives of the present invention are realized as follows:

To the measurement of high-precision mechanical component, the present invention, a method for high-precision true color three dimensional reconstruction of a mechanical component, firstly performs image acquisition: the left and the right high-resolution grayscale cameras are fixed at the same height and spaced at a certain distance, an optical transmitter is fixed between the two high-resolution grayscale cameras, and a low-resolution color camera is fixed above the optical transmitter, where the two high-resolution grayscale cameras, the optical transmitter and low-resolution color camera are needed to be adjusted, so that a measured high-precision mechanical component can be completely and clearly captured by the cameras and the optical transmitter can completely and clearly project non-coded light and coded light on the surface of the measured high-precision mechanical component. After completing the calibration procedure, the computer will calculate the parameters of the binocular high-resolution grayscale camera. The tester places the measured high-precision mechanical component at the appropriate position in the field of view, and rotates measured high-precision mechanical component in the same direction to form multiple poses, and shoots a set of images of the measured high-precision mechanical component in each pose: non-coded light is projected by the optical transmitter, the low-resolution color camera and the left high-resolution grayscale camera capture two images at the same time, the optical transmitter continues to project the encoded light according to the set reconstruction rules, and the left and right high-resolution grayscale cameras simultaneously capture each frame coded light images. Then performs image processing: all images are transmitted to a computer, after the computer receives the images, it uses image processing to record the surface information of the measured high-precision mechanical component in the point cloud by means of high-precision true color three-dimensional reconstruction, which reflects the color texture information of the surface, so as to realize the non-contact high-precision true color three dimensional reconstruction of a high-precision mechanical component. The present invention uses binocular high-precision grayscale cameras instead of binocular color cameras, which greatly broadens the range of capture wavelengths, retains the richer texture details of high-precision mechanical component, and greatly improves the accuracy of measurement. The current color reconstruction system is mostly composed of a color camera and a projector. Since the processing of the color camera needs to perform operations on the information of the three channels: R, G, B. Under the premise of higher precision, the gray-scale camera is used instead of the color camera to reconstruct the geometric texture, and the calculation amount of the computer is also reduced. Meanwhile, the calculation amount of the gray-scale camera with the same resolution is only one third of that of the color camera, which greatly improves the measurement speed of the system. The present invention provides a method for high-precision true color three dimensional reconstruction of a mechanical component, which uses a low-resolution color camera to perform true-color fusion on point clouds obtained by a high-precision binocular camera system, and improves measurement accuracy and calculation speed under the premise of controlling system costs. Different from the traditional point cloud registration method, the present invention adopts key point extraction for down sampling, and under the premise of speeding up the operation speed, more representative points are obtained to participate in the subsequent registration process. The error function of the common point cloud registration method is constructed using the point-to-point distance. A more extensive improvement method is to replace the error function with the construction based on the point-to-plane distance. However, point-to-plane distance calculation requires a good estimation of the normal vector of the point cloud, and the down sampled point cloud will greatly reduce the registration accuracy or even make the registration fail. The improved point cloud registration algorithm proposed by the invention combines the point-to-plane rapid convergence characteristics and the point-to-point accuracy, and uses the "point-to-plane & point-to-point" combination method to construct an error function, which improves the registration efficiency and ensures the registration accuracy. For image fusion, the high-resolution gray image and low-resolution color image are required to be fused in this system. The present invention adopts the fusion method combining the improved pyramid and bilateral filtering, so that the fused image can keep the color information as much as possible under the condition of ensuring rich detail information. For the fusion of the three-dimensional point cloud and the real color, the present invention adopts the method of bicubic interpolation for optimization, which reduces the distortion and loss of color information in the process of summoning, and improves the accuracy of the real color reconstruction.

Meanwhile, the present invention has the following advantageous features and innovations:

(1) The present invention uses a combination of a high-resolution gray binocular camera and a low-resolution color camera to achieve high-precision true-color point cloud reconstruction;

(2) In point cloud registration, the traditional point cloud registration is improved by point to surface and to point error fitting method, which ensures the stitching accuracy while registering quickly;

(3) A fusion method of gray image and color image is constructed. Based on the traditional Laplace pyramid decomposition method, a bilateral filter is introduced to preserve the rich detail information and color information of the fused image as much as possible.

BRIEF DESCRIPTION OF THE DRAWING

The above and other objectives, features and advantages of the present invention will be more apparent from the following detailed description taken in conjunction with the accompanying drawings, in which.

DETAILED DESCRIPTION OF THE PREFERRED EMBODIMENT

Figure 1:
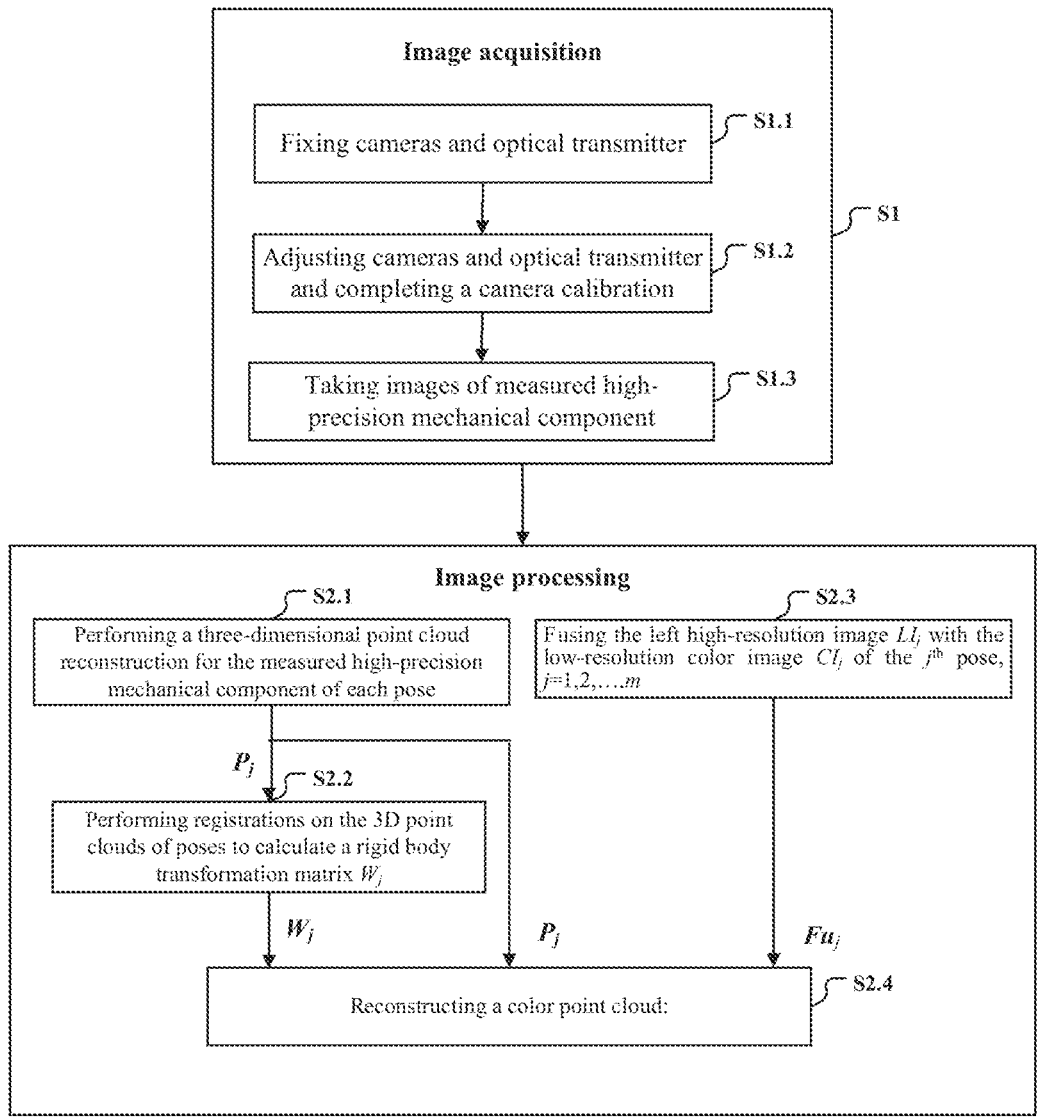
FIG. 1 is a flow diagram of a method for high-precision true color three dimensional reconstruction of a mechanical component in accordance with the present invention.

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

In one embodiment of the present invention, As shown in FIG. 1, a method for high-precision true color three dimensional reconstruction of a mechanical component in accordance with the present invention comprises:

Step S1: image acquisition

Step S1.1: fixing cameras and optical transmitter

Figure 2:
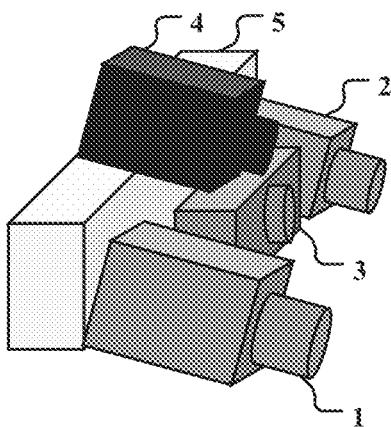
FIG. 2 is a diagram of fixation of three cameras and an optical transmitter.

As shown in FIG. 2, fixing a left high-resolution grayscale camera 1 and a right high-resolution grayscale camera 2 on a support device 5, where the right high-resolution grayscale camera 2 and the left high-resolution grayscale camera 1 are at the same height and spaced at a certain distance;

fixing an optical transmitter 3 between the left high-resolution grayscale camera 1 and right high-resolution grayscale camera 2 and a low-resolution color camera 4 above the optical transmitter.

Step S1.2: adjusting cameras and optical transmitter and completing a camera calibration Adjusting the left high-resolution grayscale camera 1, the right high-resolution grayscale camera 2, the optical transmitter 3 and the low-resolution color camera 4, so that a measured high-precision mechanical component can be completely and clearly captured by the cameras 1, 2, 4 and the optical transmitter 3 can completely and clearly project non-coded light and coded light on the surface of the measured high-precision mechanical component.

The measurement user adjusts a calibration plate and uses Zhang's calibration method to complete a camera calibration.

Step S1.3: taking images of measured high-precision mechanical component

Placing the measured high-precision mechanical component at a suitable position in the view of the cameras 1, 2, 4, then rotating the measured high-precision mechanical component in a fixed direction and acquiring images of J poses:

for the measured high-precision mechanical component of the $j^{th}$ pose, firstly the optical transmitter projects a non-coded light on the surface of the measured high-precision mechanical component, the low-resolution color camera takes an image which is denoted by low-resolution color image $CI_j$, the left high-resolution grayscale camera takes an image which is denoted by left high-resolution grayscale image $LI_j$, then the optical transmitter projects N frames of encoded light on the surface of the measured high-precision mechanical component, the left high-resolution grayscale camera and right high-resolution grayscale camera respectively take a grayscale image which are respectively denoted by $\overline{LI}_{jn}$ and $\overline{RI}_{jn}$, n=1, 2, ..., N.

Step S2: image processing

Step S2.1: performing a three-dimensional point cloud reconstruction for the measured high-precision mechanical component of each pose Reconstructing a three-dimensional point cloud of the measured high-precision mechanical component of each pose: based on the principle of binocular camera, reconstructing a three-dimensional point cloud $P_j$ of the $j^{th}$ pose by using the grayscale images $\overline{LI}_{j1}, \overline{LI}_{j2}, \ldots, \overline{LI}_{jN}$ and $\overline{RI}_{j1}, \overline{RI}_{j2}, \ldots, \overline{RI}_{jN}$ of the $j^{th}$ pose, where j=1, 2, ..., J. this step belongs to the prior art, and no more detail are described here.

Step S2.2: performing registrations on the 3D point clouds of poses to calculate a rigid body transformation matrix $W_j$ Performing registrations on 3D point clouds to calculate a rigid body transformation matrix $W_j$ by using the three-dimensional point cloud $P_j$ as a target point cloud and the three-dimensional point cloud $P_{j+1}$ of the $(j+1)^{th}$ pose as a source point cloud, where j=1, 2, ..., J−1.

Step S2.2.1: respectively performing voxel down sampling on the target point cloud $P_j$ and the source point cloud $P_{j+1}$, where the voxel down sampled target point cloud is denoted by the target point cloud $P_{j\_down}$ and the voxel down sampled source point cloud is denoted by the source point cloud $P_{j+1\_down}$, and respectively performing 3D-SIFT key point extraction on the target point cloud $P_{j\_down}$ and the target point cloud $P_{j+1\_down}$, where the extracted target point cloud is denoted by a target point cloud $P_{j\_key}$, the extracted source point cloud is denoted by a source point cloud $P_{j+1\_key}$. Voxel down sampling is that voxels of $N_{down}$% are retained at given number $N_{down}$ which is greater than 0 and less than 100. 3D-SIFT key point extraction can reduce the sample space, retain the points of rich features and reduce the amount of calculation.

Step S2.2.2: initializing iteration number k=1, setting a maximum iteration number $K_{c\_reg}$, setting an iteration number $K_{pp}$ which is used for shifting a point-to-plane error function to a point-to-point error function, initializing transformed source point cloud $P_{j+1\_key\_1}$ to the source point cloud $P_{j+1\_key}$.

Step S2.2.3: for the $k^{th}$ iteration, to each point of the source point cloud $P_{j+1\_key\_k}$, finding the nearest point in the target point cloud $P_{j\_key}$ as its corresponding point by using KD tree to obtain a corresponding point-to-point set $C_{j+\_key\_k}$, then removing the point and its nearest point whose distance is great than threshold Thres to obtain a optimized point-to-point set $C_{j\_key\_k}'$.

Step S2.2.4: homogenizing the $i^{th}$ point $p_{j+1\_key\_ki}$ of the source point cloud $P_{j+1\_key\_k}$ in point-to-point set $C_{j\_key\_k}'$ to obtain its corresponding vector $\overline{p}_{j+1\_key\_ki} = (x_{j+1\_key\_ki}, y_{j+1\_key\_ki}, z_{j+1\_key\_ki}, 1)^T$, finding corresponding point $p_{j\_key\_i}$ of the target point cloud $P_{j\_key}$ in point-to-point set $C_{j\_key\_k}'$ and homogenizing it to obtain its corresponding vector $\overline{p}_{j\_key\_i} = (x_{j\_key\_i}, y_{j\_key\_i}, z_{j\_key\_i}, 1)^T$, where i=1, 2, ..., $N_{cj\_key\_k}$, $N_{cj\_key\_k}$ is the number of point-to-point set $C_{j\_key\_k}'$;

if iteration number k is less than $K_{pp}$, then constructing a point-to-plane error function $F_{jk}$ by using the distance from the point $p_{j+1\_key\_ki}$ to the tangent plane of point $p_{j\_key\_i}$ of target point cloud $P_{j\_key}$, where the error function $F_{jk}$ is:

$$F_{jk} = \sum_{i=1}^{N_{cj\_key\_k}} ((W_{jk} \cdot \overline{p}_{(j+1)\_key\_ki} - \overline{p}_{j\_key\_i}) \cdot n_{j\_key\_i})^2$$

where $n_{j\_key\_i}$ is the normal vector corresponding to point $p_{j\_key\_i}$, $W_{jk}$ is the transformation matrix of the $k^{th}$ iteration;

if iteration number k is nor less than $K_{pp}$, then constructing a point-to-point error function $F_{jk}$ according to the sum of the squares of the distances between the corresponding points, where the error function $F_{jk}$ is:

$$F_{jk} = \sum_{i=1}^{N_{cj\_key\_k}} \|W_{jk} \cdot \overline{p}_{(j+1)\_key\_ki} - \overline{p}_{j\_key\_i}\|^2.$$

Step S2.2.5: calculating the transformation matrix $W_{jk}$ that makes the value of error function $F_{jk}$ minimum, and then applying a transformation to the source point cloud $P_{j+1\_key\_k}$ by using error function $F_{jk}$ to obtain a source point cloud $P_{j+1\_key\_(k+1)}$ and recording the value of error function $F_{jk}$ at the $k^{th}$ iteration.

Step S2.2.6: judging whether the variation $|F_{jk}-F_{j(k-1)}|$ of the value of error function of two consecutive iterations is less than a threshold e or iteration number k reaches the maximum iteration number $K_{c\_reg}$;

if yes, then recording the point-to-point set $C_{j\_key\_k'}$ at the $k'^{th}$ iteration, where k' is the iteration number when the judgment condition is met, and calculating the optimal rigid body transformation matrix $W_j = W_{jk'} W_{j(k-1)} \ldots W_{j1}$, where the optimal rigid body transformation matrix $W_j$ is a matrix of 4×4, its formation is:

$$W_j = \begin{bmatrix} R_{cloud\_j} & T_{cloud\_j} \\ \vec{0} & 1 \end{bmatrix}$$

where $R_{cloud\_j}$ is a rotation matrix of 3×3 which registers the source point cloud $P_{j+1\_key}$ to the target point cloud $P_{j\_key}$, $T_{cloud\_j}$ is a translation vector of 1×3, $\vec{0}$ is a row vector of 3×1;

if no, k=k+1, and returning step S2.2.3.

Step S2.3: fusing the left high-resolution image $LI_j$ with the low-resolution color image $CI_j$ of the $j^{th}$ pose, j=1, 2, ..., m Step S2.3.1: calculating a projection matrix $H_j$ for registering the low-resolution color image $CI_j$ to the left high-resolution image $LI_j$:

Step S2.3.1.1: respectively extracting SURF feature points from the low-resolution color image $CI_j$ and the left high-resolution image $LI_j$, and taking the extracted SURF feature points as key points. In one embodiment, the extraction of SURF feature points is:

construct different scale spaces based on box filter to form O-group S-layer image pyramid. Among them, the size of the box filter template used between groups gradually increases, the size of the filter template in different layers of the same group is the same, but the scale space factor increases layer by layer. Thus, an image composed of the determinant approximation of the Hessian matrix of each pixel in the original image is obtained in all scale spaces;

the Hessian matrix discriminant value of each pixel processed by the Hessian matrix, 8 points in its neighborhood 3×3, and 3×3×2 points in the upper and lower adjacent layers of the same group are composed of 26 pixels for size comparison. If the value is less than or greater than the value of all the other 26 points, it is preliminarily recognized as a characteristic point. The key points with weak energy and the key points with wrong location are filtered out, and the final stable feature points are filtered out;

for the extracted feature points, count the Harr wavelet features in the circular neighborhood. Take 0.2 rad step, count the sum of horizontal and vertical Harr wavelet features of all points in the π/3 sector, and take the direction of the maximum value as the main direction of the feature point;

create a square box along the main direction on the feature points and decompose it into 4×4 squares. There are 5×5 pixels in each square. The horizontal direction relative to the main direction is marked as x and the vertical direction is marked as y. For these 25 pixels, the sum Σdx of the horizontal Harr wavelet eigenvalues relative to the main direction, the sum Σdy of the vertical Harr wavelet eigenvalues, the sum Σ|dx| of the absolute values of the horizontal Harr wavelet eigenvalues, and the sum Σ|dy| of the absolute values of the vertical Harr wavelet eigenvalues are calculated respectively, a total of four eigenvalues. For a feature point, record a total of 4×4×4=64 dimensional feature vectors.

Step S2.3.1.2: to each key point of the low-resolution color image $CI_j$, finding the closest key point and the next closest key point in the left high-resolution image $LI_j$ according to Euclidean distance, if the ratio of the distance of the closest key point to the distance of the next closet key point is less than a set threshold θ, then determining the closest key point in the left high-resolution image $LI_j$ as the matching point, thus a matching point pair set $C_{cl\_j}$ is obtained.

Step S2.3.1.3: setting a maximum iteration number $K_{p\_reg}$ and an error threshold φ, initializing iteration number k=1, then optimizing the matching point pair set $C_{cl\_j}$ through random sampling consistency (RANSAC) algorithm to obtain the projection matrix $H_j$.

Step S2.3.1.3.1: for the $k^{th}$ iteration in the process of optimizing the matching point pair set $C_{cl\_j}$, randomly selecting four point pairs, which are denoted respectively by $\{q_{cj\_1}, q_{lj\_1}\}$, $\{q_{cj\_2}, q_{lj\_2}\}$, $\{q_{cj\_3}, q_{lj\_3}\}$ and $\{q_{cj\_4}, q_{lj\_4}\}$, and homogenizing them to obtain four point pairs $\{\bar{q}_{cj\_1}, \bar{q}_{lj\_1}\}$, $\{\bar{q}_{cj\_2}, \bar{q}_{lj\_2}\}$, $\{\bar{q}_{cj\_3}, \bar{q}_{lj\_3}\}$ and $\{\bar{q}_{cj\_4}, \bar{q}_{lj\_4}\}$, then calculating a projection matrix $H_{jk}$ between the four point pairs, which satisfies the following relationship:

$$\bar{q}_{lj\_i} = H_{jk} \bar{q}_{cj\_i}, i=1,2,\ldots,4$$

Step S2.3.1.3.2: homogenizing a point pair $\{q_{cj\_i}, q_{lj\_i}\}$ other than the selected four point pairs from the matching point pair set $C_{cl\_j}$ to obtain point pair $\{\bar{q}_{cj\_i}, \bar{q}_{lj\_i}\}$, then calculating a mapping error $\varepsilon_{jk\_i}=\|\bar{q}_{lj\_i}, H_{jk}\bar{q}_{cj\_i}\|$ according to the projection matrix $H_{jk}$, where i=5, 5, ..., $N_{cj}$, $N_{cj}$ is the number of point pairs of the matching point pair set $C_{cl\_j}$, and selecting the point pair which mapping error $\varepsilon_{jk\_i}<\varphi$ to form a interior point set $S_{jk}$.

Step S2.3.1.3.3: if the last iteration has been performed, namely $k=K_{p\_reg}$ then comparing $S_{j1}, S_{j2}, \ldots, S_{jK_{p\_reg}}$ to select the projection matrix $H_{jk}$ as the projection matrix $H_j$ when the interior point set $S_{jk}$ is the largest, or k=k+1 and returning step S2.3.1.3.1.

Step S2.3.2: registering the low-resolution color image $CI_j$ to the left high-resolution image $LI_j$ according to the projection matrix $H_j$ to obtain a high-resolution registered color image $CI_{j\_r}$.

Figure 3:
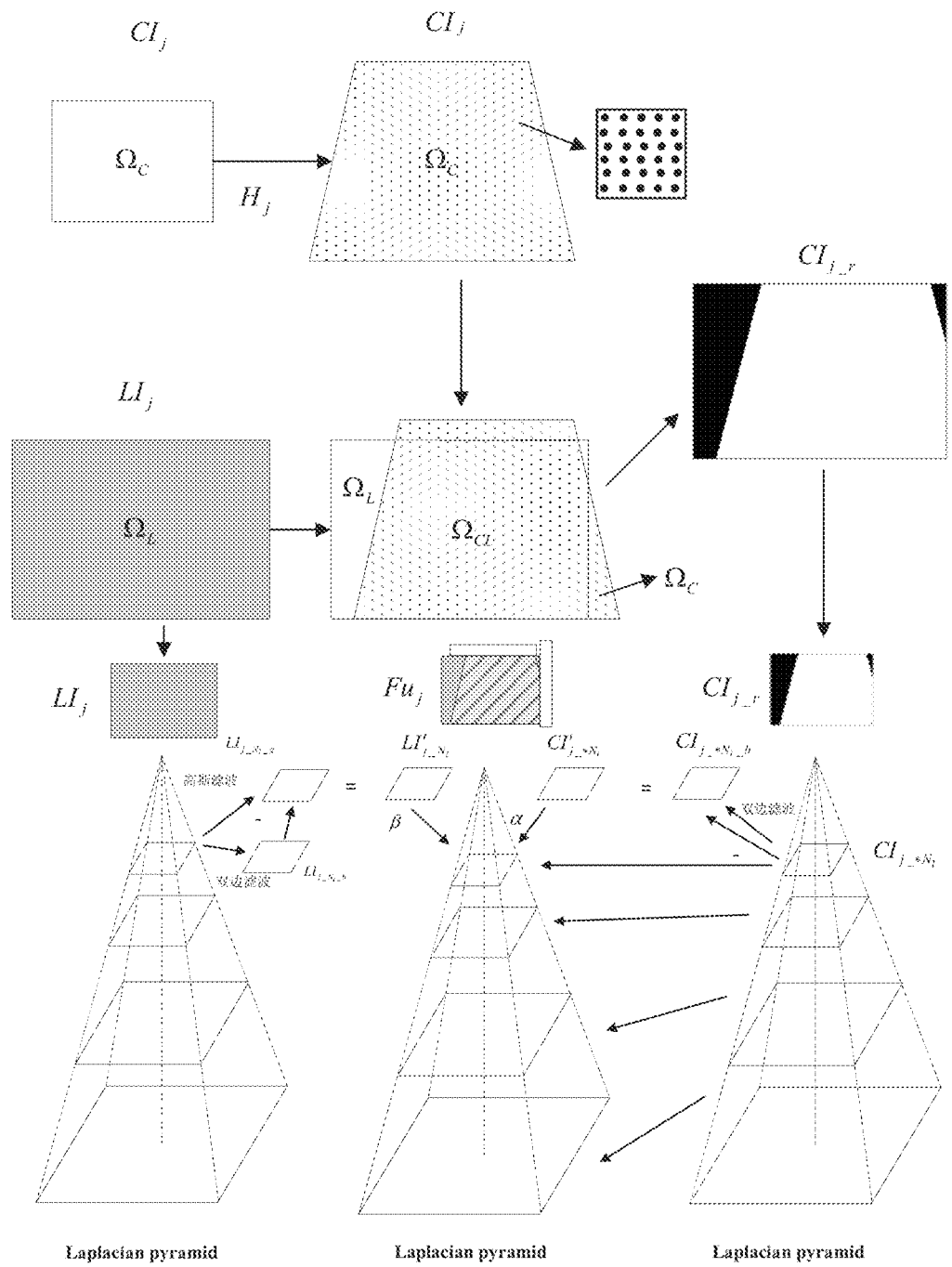
FIG. 3 is a diagram of fusing the left high-resolution image $LI_j$ with the low-resolution color image.

Step S2.3.2.1: creating a empty high-resolution registered color image $CI_{j\_r}$ which has the same size with the left high-resolution image $LI_j$, then performing coordinate transformation on the pixels of the low-resolution color image $CI_j$ to obtain a color image $CI_j'$. In one embodiment, as shown in FIG. 3, the view range of the low-resolution color image $CI_j$ is $\Omega_C$, after coordinate transformation, its view range is not changed and still is $\Omega_C$, namely the view range of the color image $CI_j'$ is $\Omega_C$. The pixel points after coordinate transformation have decimal coordinates, namely the decimal coordinates of the pixel points are not aligned. The view range of the left high-resolution image $LI_j$ is $\Omega_L$.

Step S2.3.2.2: determining the interpolation range: the pixel points of the high-resolution registered color image $CI_{j\_r}$ which are located on color image $CI_j'$ and other than the matching points in matching point pair set $C_{cl\_j}$ are the points which are needed to be interpolated, namely interpolation points. In one embodiment, as shown in FIG. 3, the overlapped view range is $\Omega_{CL}$. The pixel points within $\Omega_{CL}$ and not in matching point pair set $C_{cl\_j}$ are the points which are needed to be interpolated.

Step S2.3.2.3: using the bilinear interpolation method to interpolate the pixel values of all interpolation points: to the $i^{th}$ interpolation point $q_{cj\_r\_i}(x_{cj\_r\_i}, y_{cj\_r\_i})$, performing a inverse transformation according to the projection matrix $H_j$ to obtain a pixel point $\rho_{cj\_i}(x_{cj\_p\_i}, y_{cj\_p\_i})$ located on the low-resolution color image $CI_j$, and finding four nearest pixel points which are denoted respectively by $p_{cj\_p\_i11}$ $(x_{cj\_p\_i1}, y_{cj\_p\_i1})$, $p_{cj\_p\_i12}(x_{cj\_p\_i1}, y_{cj\_p\_i2})$, $p_{cj\_p\_i21}$ $(x_{cj\_p\_i2}, y_{cj\_p\_i1})$ and $p_{cj\_p\_i22}(x_{cj\_p\_i2}, y_{cj\_p\_i2})$:

firstly interpolating in the x direction to obtain the following pixel values:

$$CI_j(x_{cj\_p\_i}, y_{cj\_p\_i1}) = \frac{x_{cj\_p\_i2} - x_{cj\_p\_i}}{x_{cj\_p\_i2} - x_{cj\_p\_i1}} CI_j(x_{cj\_p\_i1}, y_{cj\_p\_i1}) +$$
$$\frac{x_{cj\_p\_i} - x_{cj\_p\_i1}}{x_{cj\_p\_i2} - x_{cj\_p\_i1}} CI_j(x_{cj\_p\_i2}, y_{cj\_p\_i1})$$

$$CI_j(x_{cj\_p\_i}, y_{cj\_p\_i2}) = \frac{x_{cj\_p\_i2} - x_{cj\_p\_i}}{x_{cj\_p\_i2} - x_{cj\_p\_i1}} CI_j(x_{cj\_p\_i1}, y_{cj\_p\_i2}) +$$
$$\frac{x_{cj\_p\_i} - x_{cj\_p\_i1}}{x_{cj\_p\_i2} - x_{cj\_p\_i1}} CI_j(x_{cj\_p\_i2}, y_{cj\_p\_i2})$$

then interpolating in the y direction to obtain the following pixel value:

$$CI_j(x_{cj\_p\_i}, y_{cj\_p\_i}) = \text{Round}\left(\frac{y_{cj\_p\_i2} - y_{cj\_p\_i}}{y_{cj\_p\_i2} - y_{cj\_p\_i1}} CI_j(x_{cj\_p\_i}, y_{cj\_p\_i1}) + \frac{y_{cj\_p\_i} - y_{cj\_p\_i1}}{y_{cj\_p\_i2} - y_{cj\_p\_i1}} CI_j(x_{cj\_p\_i}, y_{cj\_p\_i2})\right)$$

letting the pixel value $CI_{j\_r}(x_{cj\_r\_i}, y_{cj\_r\_i})$ of the interpolation point $q_{cj\_r\_i}(x_{cj\_r\_i}, y_{cj\_r\_i})$ be $CI_j(x_{cj\_p\_i}, y_{cj\_p\_i})$.

Figure 4:
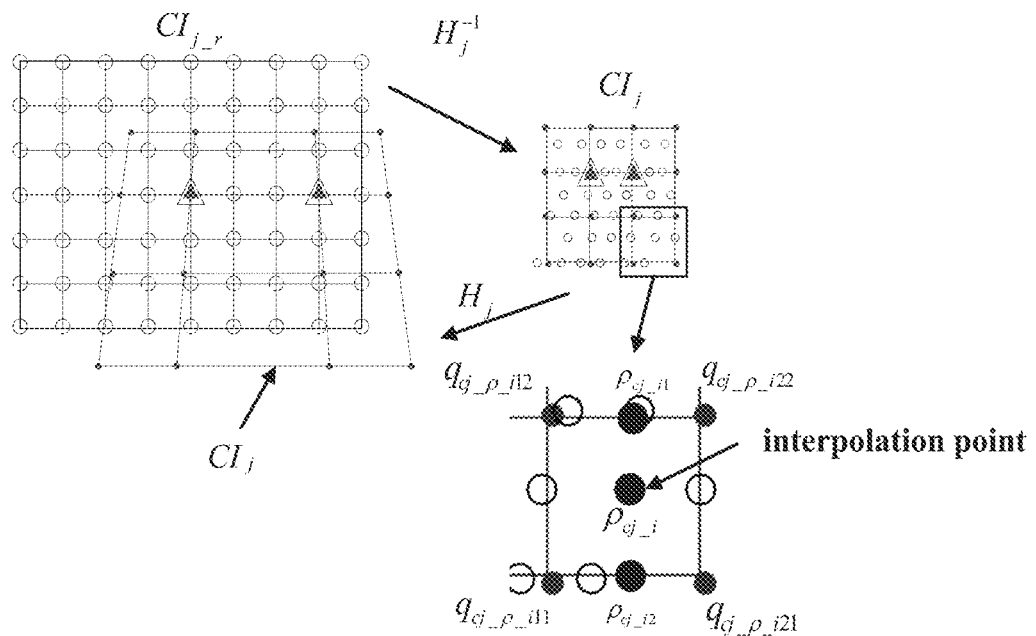
FIG. 4 is a diagram of interpolating the pixel value of interpolation point by using the bilinear interpolation method.

In one embodiment, as shown in FIG. 4, the circles are the interpolation points of the high-resolution registered color image $CI_{j\_r}$. Taking the interpolation points in the lower right corner as an example, performing a inverse transformation according to the projection matrix $H_j$ to obtain a location on the low-resolution color image $CI_j$. On the low-resolution color image $CI_j$, the dots are the pixel points of the low-resolution color image $CI_j$. In the embodiment, taking a interpolation point $\rho_{cj\_i}(x_{cj\_p\_i}, y_{cj\_p\_i})$ (the circle pointed to by an arrow on the low-resolution color image $CI_j$) in the lower right corner as an example, the nearest four pixel points are $p_{cj\_p\_i11}(x_{cj\_p\_i1}, y_{cj\_p\_i1})$, $p_{cj\_p\_i12}(x_{cj\_p\_i1}, y_{cj\_p\_i2})$, $p_{cj\_p\_i21}(x_{cj\_p\_i2}, y_{cj\_p\_i1})$ and $p_{cj\_p\_i22}(x_{cj\_p\_i2}, y_{cj\_p\_i2})$, then interpolates in the x direction, namely, respectively interpolates the pixel value $CI_j(x_{cj\_p\_i}, y_{cj\_p\_i1})$ of point $\rho_{cj\_i1}(x_{cj\_p\_i1}, y_{cj\_p\_i1})$ and the pixel value $CI_j(x_{cj\_p\_i}, y_{cj\_p\_i2})$ of point $\rho_{cj\_i2}(x_{cj\_p\_i}, y_{cj\_p\_i2})$ by respectively using corresponding nearest pixel points in the x direction, finally interpolates in the x direction to obtain the pixel value of interpolation point $\rho_{cj\_i}(x_{cj\_p\_i}, y_{cj\_p\_i})$, i.e. the pixel value of interpolation point $q_{cj\_r\_i}(x_{cj\_r\_i}, y_{cj\_r\_i})$.

Step S2.3.2.4: to the pixel points of the high-resolution registered color image $CI_{j\_r}$ which are located on color image $CI_j$ and are the matching points in matching point pair set $C_{cl\_j}$, directly using the pixel values of their corresponding matching point in the low-resolution color image $CI_j$ to assign; and to the pixel points of the high-resolution registered color image $CI_{j\_r}$ which are not located on color image $CI_j$, directly using preset RGB value to assign, thus the high-resolution registered color image $CI_{j\_r}$ is obtained. In the embodiment, as shown in FIG. 4, the triangle points are the pixel points of the high-resolution registered color image $CI_{j\_r}$, which are located on color image $CI_j$ and are the matching points in matching point pair set $C_{cl\_j}$, and can be directly assigned by the pixel values of the corresponding points on the low-resolution color image $CI_j$. After the interpolating and assigning, to the pixel points of the high-resolution registered color image $CI_{j\_r}$ which are not located on color image $CI_j$ namely not the pixel points within the overlapped view range $\Omega_{CL}$, setting their RGB value to 0. As shown in FIG. 4, the black area on the high-resolution registered color image $CI_{j\_r}$ are set to 0.

Step S2.3.3: fusing the left high-resolution image $LI_j$ with the high-resolution registered color image $CI_{j\_r}$.

Step S2.3.3.1: in one embodiment, as shown in FIG. 3, performing $N_l$-layer Laplacian pyramid decomposition on the left high-resolution image $LI_j$ to obtain $N_l$ layers of image $LI_{j\_w}$, performing $N_l$-layer Laplacian pyramid decomposition on each channel of the high-resolution registered color image $CI_{j\_r}$ to obtain $N_l$ layers of image $CI_{j\_rw}$ on R channel, $N_l$ layers of image $CI_{j\_gw}$ on G channel and $N_l$ layers of image $CI_{j\_bw}$ on B channel, where $w=1, 2, \ldots, N_l$ and represents the serial number of image.

Step S2.3.3.2: respectively performing bilateral filter on the top-layer images $CI_{j\_rN_l}$, $CI_{j\_gN_l}$, $CI_{j\_bN_l}$ and $LI_{j\_N_l}$ to obtain top-layer images $CI_{j\_rN_l\_b}$, $CI_{j\_gN_l\_b}$, $CI_{j\_bN_l\_b}$ and $LI_{j\_N_l\_b}$;

Step S2.3.3.3: to the top-layer images of three channels of the high-resolution registered color image $CI_{j\_r}$, calculating the difference before and after bilateral filtering to obtain detail layer images $CI_{j\_rN_l}'=CI_{j\_rN_l}-CI_{j\_rN_l\_b}$, $CI_{j\_gN_l}'=CI_{j\_gN_l}-CI_{j\_gN_l\_b}$ and $CI_{j\_bN_l}'=CI_{j\_bN_l}-CI_{j\_bN_l\_b}$, which have rich details of image.

Step S2.3.3.4: performing Gaussian filter on the top-layer image of the left high-resolution image $LI_j$ to obtain a overall smooth image $LI_{j\_N_l\_g}$, then calculating the difference between the top-layer image $LI_{j\_N_l\_b}$ and the overall smooth image $LI_{j\_N_l\_g}$ to obtain a layer image $LI_{j\_N_l}'=LI_{j\_N_l\_b}-LI_{j\_N_l\_g}$ which has rich edge information.

Step S2.3.3.5: calculating top-layer fusion images, where the top-layer fusion image of R channel is: $Fu_{j\_N_l\_r}=CI_{j\_rN_l}+\alpha CI_{j\_rN_l}'+\beta LI_{j\_N_l}'$, the top-layer fusion image of G channel is: $Fu_{j\_N_l\_g}=CI_{j\_gN_l}+\alpha CI_{j\_gN_l}'+\beta LI_{j\_N_l}'$, the top-layer fusion image of B channel is: $Fu_{j\_N_l\_r}=CI_{j\_rN_l}+\alpha CI_{j\_rN_l}'+\beta LI_{j\_N_l}'$;

Step S2.3.3.6: in one embodiment, as shown in FIG. 3, to the layer fusion images other than the top-layer fusion images, for the reason of retaining the rich color information, assigning the layer fusion images of R channel according to equation $Fu_{j\_w\_r}=CI_{j\_rw}$, the layer fusion images of G channel according to equation $Fu_{j\_w\_g}=CI_{j\_gw}$ and the layer fusion images of B channel according to equation $Fu_{j\_w\_b}=CI_{j\_bw}$, where $w=1, 2, \ldots, N_l-1$;

Step S2.3.3.7: based on all layer fusion images of each color channel, performing $N_l$-layer Laplacian pyramid composition to obtain fusion images of each color channel, thus the color fusion image of the $j^{th}$ pose is obtained and denoted by $Fu_j$.

Step S2.4: reconstructing a color point cloud:

Step S2.4.1: performing color reconstruction on point cloud of each pose to obtain color point clouds $\tilde{P}_1, \tilde{P}_2, \ldots, \tilde{P}_m$:

Step S2.4.1.1: to each point $p_{ji}(x_{ji}, y_{ji}, z_{ji})$ of the three-dimensional point cloud $P_j$ of the measured high-precision mechanical component of the $j^{th}$ pose, performing a coordinate system conversion from three-dimensional point to pixel point:

$$Z_c \begin{bmatrix} a_{ji} \\ b_{ji} \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R_c & T_c \\ \overrightarrow{0} & 1 \end{bmatrix} \begin{bmatrix} x_{ji} \\ y_{ji} \\ z_{ji} \\ 1 \end{bmatrix}$$

where $z_c$ is a scale factor, $f_x$ and $f_y$ are respectively the focal lengths of camera in the x and y direction, $u_0$ and $v_0$ are respectively the coordinates of camera's main point on pixel plane, $R_c$ and $T_c$ are respectively the rotation matrix and the translation vector in camera calibration parameters, $(a_{ji}, b_{ji})$ are the coordinates of the pixel point $q_{ij}$ corresponding to the point $p_{ji}$ $(x_{ji}, y_{ji}, z_{ji})$ of the three-dimensional point cloud $P_j$, i is the serial number of the point.

Step S2.4.1.2: obtaining pixel value $R(a_{ji}, b_{ji})$ of R channel, pixel value $G(a_{ji}, b_{ji})$ of G channel and pixel value $B(a_{ji}, b_{ji})$ of B channel of pixel point at coordinates $(a_{ji}, b_{ji})$ on the color fusion image $Fu_j$, then assigning pixel values to the point $p_{ij}(x_{ij}, y_{ji}, z_{ji})$ of the three-dimensional point cloud $P_j$ according to the following equations: $R(x_{ji}, y_{ji}, z_{ji}) = R(a_{ji}, b_{ji})$, $G(x_{ji}, y_{ji}, z_{ji}) = G(a_{ji}, b_{ji})$ and $B(x_{ji}, y_{ji}, z_{ji}) = B(a_{ji}, b_{ji})$ to obtain color point cloud $\tilde{P}_j$, j=1, 2, . . . , m, where $R(x_{ji}, y_{ji}, z_{ji})$, $G(x_{ji}, y_{ji}, z_{ji})$ and $B(x_{ji}, y_{ji}, z_{ji})$ are respectively the point values of R, G and B channel of point $p_{ji}(x_{ji}, y_{ji}, z_{ji})$ of color point cloud $\tilde{P}_j$.

Step S2.4.2: registering the color point clouds of all poses: based on the series of rigid body transformation matrices $W_1, W_2, \ldots, W_{m-1}$ which are obtained according to step 2.2, performing registration by respectively converting the color point clouds $\tilde{P}_2, \tilde{P}_3, \tilde{P}_m$ to the coordinate system of the color point cloud $\tilde{P}_1$, where the color point clouds after conversion are respectively denoted by $\tilde{P}_2, \tilde{P}_3^*, \ldots, \tilde{P}_m^*$, there have:

$$\tilde{P}_2^* = W_1 \tilde{P}_2$$

$$\tilde{P}_3^* = W_1 W_2 \tilde{P}_3$$

. . .

$$\tilde{P}_m^* = W_1 W_2 \ldots W_{m-1} \tilde{P}_m$$

Step S2.4.3: fusing the overlapping part of the color point clouds:

setting $\tilde{G}_1^* = \tilde{P}_1^* = \tilde{P}_1$, then fusing the color point cloud $\tilde{P}_2^*$ with the color point cloud $\tilde{G}_1^*$ to obtain a color point cloud $\tilde{G}_2^*$ to j=2, 3, . . . m−1, successfully fusing the color point cloud $\tilde{P}_{j+1}^*$ with the color point cloud $\tilde{G}_j^*$ to obtain a color point cloud $\tilde{G}_{j+1}^*$ and finally obtaining a fused overall color point cloud $\tilde{G}_m^*$ that the high-precision true color three dimensional reconstruction is complete;

where the fusion of the color point cloud $\tilde{P}_{j+1}^*$ and the color point cloud $\tilde{G}_j^*$ is:

to the matching point pair in the point-to-point set $C_{j\_key\_k}'$, directly taking it as a correspondence point pair and putting it into a correspondence point pair set $Co_j$;

to a non-matching point $\tilde{p}_{j+1\_i}^*(\tilde{x}_{j+1\_i}^*, \tilde{y}_{j+1\_i}^*, \tilde{z}_{j+1\_i}^*)$ of the color point cloud $\tilde{P}_{j+1}^*$, finding the nearest point in the color point cloud $\tilde{P}_{j+1}^*$ by using KD tree, and then calculating the average value σ of all distances between non-matching points and their respective nearest points; simultaneously, to each non-matching point of the color point cloud $\tilde{G}^*$ finding the nearest point in the color point cloud $\tilde{P}_{j+1}^*$ by using KD tree, if the distance of the nearest point is less than the average value σ, then the non-matching point of the color point cloud $\tilde{G}_j^*$ and its nearest point in the color point cloud $\tilde{P}_{j+1}^*$ are taken as a correspondence point pair and put into the correspondence point pair set $Co_j$;

weighting geometric coordinates of each correspondence point pair $\{\tilde{p}_{j+1\_i}^*(\tilde{x}_{j+1\_i}^*, \tilde{y}_{j+1\_i}^*, \tilde{z}_{j+1\_i}^*), \tilde{g}_{j\_i}^*(\tilde{x}_{j\_i}^*, \tilde{y}_{j\_i}^*, \tilde{z}_{j\_i}^*)\}$ in the correspondence point pair set $Co_j$ with the weights $\alpha_i$ and $\beta_i$ to obtain the coordinates of a fused point $\tilde{g}_{j+1\_i}^*$:

$(\alpha_i \tilde{x}_{j+1\_i}^* + \beta_i \tilde{x}_{j\_i}^*, \alpha_i \tilde{y}_{j+1\_i}^* + \beta_i \tilde{y}_{j\_i}^*, \alpha_i \tilde{z}_{j+1\_i}^* + \beta_i \tilde{z}_{j\_i}^*)$ respectively weighting the point values of R, G and B channel of each correspondence point pair $\{\tilde{p}_{j+1\_i}^*(\tilde{x}_{j+1\_i}^*, \tilde{y}_{j+1\_i}^*, \tilde{z}_{j+1\_i}^*), \tilde{g}_{j\_i}^*(\tilde{x}_{j\_i}^*, \tilde{y}_{j\_i}^*, \tilde{z}_{j\_i}^*)\}$ in the correspondence point pair set $Co_j$ with the weights $(\alpha_{ri}, \beta_{ri})$, $(\alpha_{gi}, \beta_{gi})$ and $(\alpha_{bi}, \beta_{bi})$ to obtain the point values $R(\tilde{g}_{j+1\_i}^*)$, $G(\tilde{g}_{j+1\_i}^*)$ and $B(\tilde{g}_{j+1\_i}^*)$ of R, G and B channel of the point $\tilde{g}_{j+1\_i}^*$ of the color point cloud $\tilde{G}_{j+1}^*$:

$$R(\tilde{g}_{j+1\_i}^*) = \alpha_{ri} R(\tilde{p}_{j+1\_i}^*) + \beta_{ri} R(\tilde{g}_{j\_i}^*)$$

$$G(\tilde{g}_{j+1\_i}^*) = \alpha_{gi} G(\tilde{p}_{j+1\_i}^*) + \beta_{gi} G(\tilde{g}_{j\_i}^*)$$

$$B(\tilde{g}_{j+1\_i}^*) = \alpha_{bi} B(\tilde{p}_{j+1\_i}^*) + \beta_{bi} B(\tilde{g}_{j\_i}^*)$$

where, i=1, 2, . . . , $N_{coj}$, $N_{coj}$ is the number of the correspondence point pairs, $R(\tilde{p}_{j+1\_i}^*)$, $G(\tilde{p}_{j+1\_i}^*)$ and $(\tilde{p}_{j+1\_i}^*)$ are respectively the point values of R, G and B channel of the point $\tilde{p}_{j+1\_i}^*$, $R(\tilde{g}_{j\_i}^*)$, $G(\tilde{g}_{j\_i}^*)$ and $B(\tilde{g}_{j\_i}^*)$ are respectively the point values of R, G and B channel of the point $\tilde{g}_{j\_i}^*$ of the color point cloud $\tilde{G}_{j+1}^*$.

Example

In this example, a dumbbell shaped standard component is reconstructed with high-precision color 3D point cloud. Turn on the left and right high-resolution gray cameras, the optical transmitter and the low-resolution color camera, and adjust the angles and parameters of the cameras so that the dumbbell shaped standard component can be completely and clearly captured by the cameras, then adjust the angles and parameters of the optical transmitter so that the optical transmitter can completely and clearly project non-coded light and coded light on the surface of the dumbbell shaped standard component.

Figure 5:
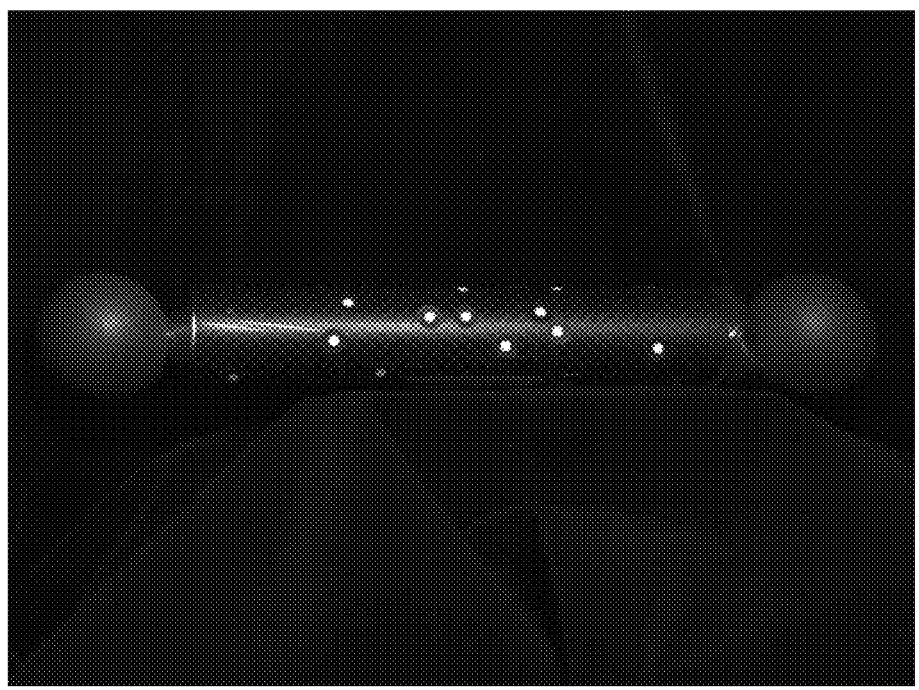
FIG. 5 is an illustration of a left high-resolution grayscale image of a dumbbell shaped standard component.
Figure 6:
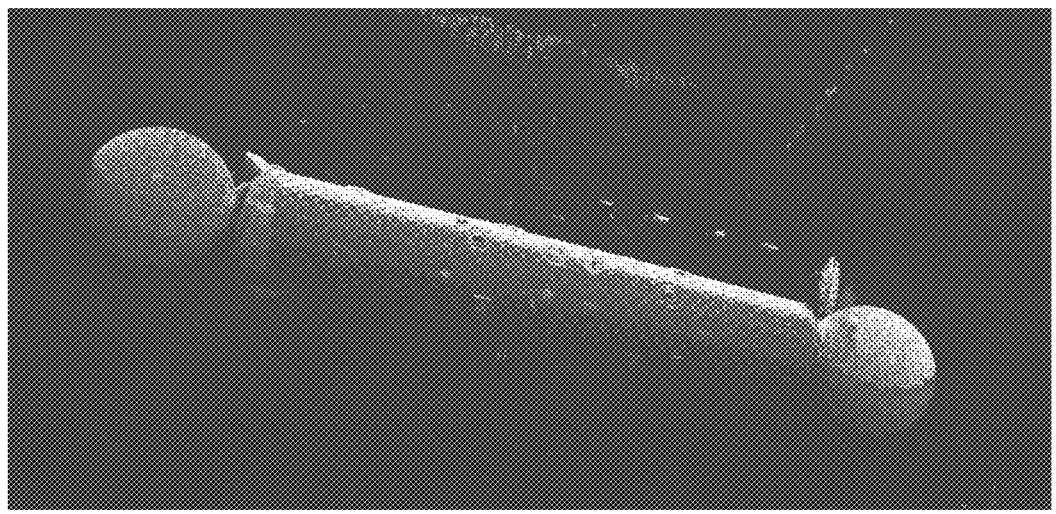
FIG. 6 is an illustration of the fused overall color point cloud of a dumbbell shaped standard component under three poses.

The measurement user places a checkerboard calibration plate at a suitable position in the view of the cameras, rotates the checkerboard calibration plate in the same plane at different angles, takes a group of high-resolution gray images of the checkerboard calibration plate and transmits them to a computer. The compute calculates the parameters of the left and right high-resolution gray cameras through Zhang's calibration method. The measurement user places the dumbbell shaped standard component at a suitable position in the view of the cameras and records it as pose 1. When the optical transmitter projects the non-coded light, the measurement user takes a group of images, including the low-resolution color image and the left high-resolution grayscale image which shown in FIG. 5. When the optical transmitter projects the coded light, a group of images of the left and right high-resolution gray cameras are acquired and transmitted to the computer. The measurement user rotates the dumbbell shaped standard component at a certain angle and records it as pose 2. a group of images are acquired and transmitted to the computer. The tester rotates the dumbbell shaped standard part by a certain angle along the same direction and records it as pose 3, another of images are acquired and transmitted to the computer. Thus the images of J poses have been acquired, the image acquisition is complete, where J=3. Then the computer uses an image processing program to complete the reconstruction of color point clouds, and fuses the color point clouds under three poses together, and the fused overall color point cloud is shown in FIG. 6.

Figure 7:
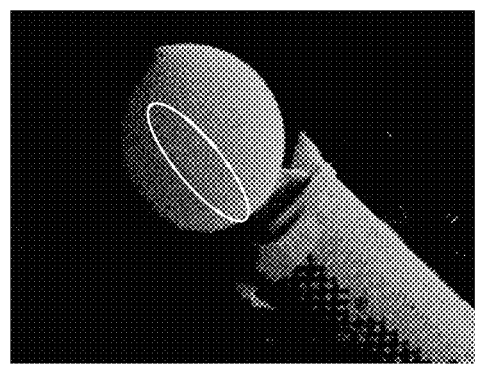
FIG. 7 is an illustration of a detail part of a direct fused overall color point cloud of a dumbbell shaped standard component under three poses.
Figure 8:
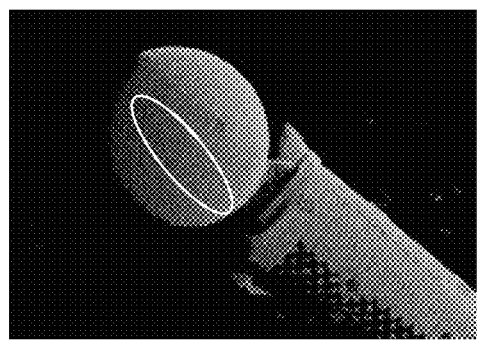
FIG. 8 is an illustration of a detail part of a fused overall color point cloud of a dumbbell shaped standard component under three poses in accordance with the present invention.

FIG. 7 shows the details of the stitching of three pose point clouds. It can be seen that the direct stitching of each pose leads to uneven resolution of the overall point cloud, the density of the overlapping area is higher than that of other parts, and the points with the same name are given different color channel values. The spliced point clouds are fused to obtain the overall point cloud shown in FIG. 8. Compared with FIG. 7, the details (shown in white oval circle) in FIG. 8 do not appear layered, and the values of points with the same name are processed uniformly, and the redundant point cloud information is deleted. The point cloud reconstruction obtained by the invention realizes the restoration of high precision and real color.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for high-precision true color three dimensional reconstruction of a mechanical component, comprising:

(1). image acquisition 1.1). fixing a left high-resolution grayscale camera and a right high-resolution grayscale camera on a support device, where the right high-resolution grayscale camera and the left high-resolution grayscale camera are at the same height and spaced at a certain distance;

fixing an optical transmitter between the left high-resolution grayscale camera and right high-resolution grayscale camera and a low-resolution color camera above the optical transmitter;

1.2). adjusting the left high-resolution grayscale camera, the right high-resolution grayscale camera, the optical transmitter and the low-resolution color camera, so that a measured high-precision mechanical component can be completely and clearly captured by the cameras and the optical transmitter can completely and clearly project non-coded light and coded light on the surface of the measured high-precision mechanical component;

adjusting a calibration plate and using Zhang's calibration method to complete a camera calibration;

1.3). placing the measured high-precision mechanical component at a suitable position in the view of the cameras, then rotating the measured high-precision mechanical component in a fixed direction and acquiring images of J poses:

for the measured high-precision mechanical component of the $j^{th}$ pose, firstly the optical transmitter projects a non-coded light on the surface of the measured high-precision mechanical component, the low-resolution color camera takes image which is denoted by low-resolution color image $CI_j$, the left high-resolution grayscale camera takes an image which is denoted by left high-resolution grayscale image $LI_j$, then the optical transmitter projects N frames of encoded light on the surface of the measured high-precision mechanical component, the left high-resolution grayscale camera and right high-resolution grayscale camera respectively take a grayscale image which are respectively denoted by $\overline{LI}_{jn}$ and $\overline{RI}_{jn}$, n=1, 2, . . . , N;

(2). image processing 2.1). reconstructing a three-dimensional point cloud of the measured high-precision mechanical component of each pose: based on the principle of binocular camera, reconstructing a three-dimensional point cloud $P_j$ of the $j^{th}$ pose by using the grayscale images $\overline{LI}_{j1}, \overline{LI}_{j2}, \ldots, \overline{LI}_{jN}$ and $\overline{RI}_{j1}, \overline{RI}_{j2}, \ldots, \overline{RI}_{jN}$ of the $j^{th}$ pose, where j=1, 2, . . . , J;

2.2). performing registrations on 3D point clouds to calculate a rigid body transformation matrix $W_j$ by using the three-dimensional point cloud $P_j$ as a target point cloud and the three-dimensional point cloud $P_{j+1}$ of the $(j+1)^{th}$ pose as a source point cloud, where j=1, 2, . . . , J-1:

2.2.1). respectively performing voxel down sampling on the target point cloud $P_j$ and the source point cloud $P_{j+1}$, where the voxel down sampled target point cloud is denoted by the target point cloud $P_{j\_down}$ and the voxel down sampled source point cloud is denoted by the source point cloud $P_{j+1\_down}$, and respectively performing 3D-SIFT key point extraction on the target point cloud $P_{j\_down}$ and the target point cloud $P_{j+1\_down}$, where the extracted target point cloud is denoted by a target point cloud $P_{j\_key}$, the extracted source point cloud is denoted by a source point cloud $P_{j+1\_key}$;

2.2.2). initializing iteration number k=1, setting a maximum iteration number $K_{c\_reg}$, setting an iteration number $K_{pp}$ which is used for shifting a point-to-plane error function to a point-to-point error function, initializing transformed source point cloud $P_{j+1\_key\_1}$ to the source point cloud $P_{j+1\_key}$;

2.2.3). for the $k^{th}$ iteration, to each point of the source point cloud $P_{j+1\_key\_k}$, finding the nearest point in the target point cloud $P_{j\_key}$ as its corresponding point by using KD tree to obtain a corresponding point-to-point set $C^{j+1\_key\_k}$, then removing the point and its nearest point whose distance is great than threshold Thres to obtain a optimized point-to-point set $C_{j\_key\_k}'$;

2.2.4). homogenizing the $i^{th}$ point $p_{j+1\_key\_ki}$ of the source point cloud $P_{j+1\_key\_k}$ in point-to-point set $C_{j\_key\_k}'$ to obtain its corresponding vector $\overline{p}_{j+1\_key\_ki}=(x_{j+1\_key\_ki}, y_{j+1\_key\_ki}, z_{j+1\_key\_ki}, 1)^T$, finding corresponding point $p_{j\_key\_i}$ of the target point cloud $P_{j\_key}$ in point-to-point set $C_{j\_key\_k}'$ and homogenizing it to obtain its corresponding vector $\overline{p}_{j\_key\_i}=(x_{j\_key\_i}, y_{j\_key\_i}, z_{j\_key\_i}, 1)^T$, where i=1, 2, . . . , $N_{cj\_key\_k}$, $N_{cj\_key\_k}$ is the number of point-to-point set $C_{j\_key\_k}'$;

if iteration number k is less than $K_{pp}$, then constructing a point-to-plane error function $F_{jk}$ by using the distance from the point $p_{j+1\_key\_ki}$ to the tangent plane of point $p_{j\_key\_i}$ of target point cloud $P_{j\_key}$, where the error function $F_{jk}$ is:

$$F_{jk} = \sum_{i=1}^{N_{cj\_key\_k}} ((W_{jk} \cdot \overline{p}_{(j+1)\_key\_ki} - \overline{p}_{j\_key\_i}) \cdot n_{j\_key\_i})^2$$

where $n_{j\_key\_i}$ is the normal vector corresponding to point $p_{j\_key\_i}$, $W_{jk}$ is the transformation matrix of the $k^{th}$ iteration;

if iteration number k is nor less than $K_{pp}$, then constructing a point-to-point error function $F_{jk}$ according to the sum of the squares of the distances between the corresponding points, where the error function $F_{jk}$ is:

$$F_{jk} = \sum_{i=1}^{N_{cj\_key\_k}} \|W_{jk} \cdot \overline{p}_{(j+1)\_key\_ki} - \overline{p}_{j\_key\_i}\|^2;$$

2.2.5). calculating the transformation matrix $W_{jk}$ that makes the value of error function $F_{jk}$ minimum, and then applying a transformation to the source point cloud $P_{j+1\_key\_k}$ by using error function $F_{jk}$ to obtain a source point cloud $P_{j+1\_key\_(k+1)}$ and recording the value of error function $F_{jk}$ at the $k^{th}$ iteration;

2.2.6). judging whether the variation $|F_{jk}-F_{j(k-1)}|$ of the value of error function of two consecutive iterations is less than a threshold e or iteration number k reaches the maximum iteration number $K_{c\_reg}$;

if yes, then recording the point-to-point set $C_{j\_key\_k'}$ at the $k'^{th}$ iteration, where k' is the iteration number when the judgment condition is met, and calculating the optimal rigid body transformation matrix $W_j = W_{jk'} W_{j(k'-1)} \cdots W_{j1}$, where the optimal rigid body transformation matrix $W_j$ is a matrix of 4×4, its formation is:

$$W_j = \begin{bmatrix} R_{cloud\_j} & T_{cloud\_j} \\ \vec{0} & 1 \end{bmatrix}$$

where $R_{cloud\_j}$ is a rotation matrix of 3×3 which registers the source point cloud $P_{j+1\_key}$ to the target point cloud $P_{j\_key}$, $T_{cloud\_j}$ is a translation vector of 1×3, $\vec{0}$ is a row vector of 3×1;

if no, k=k+1, and returning step 2.2.3);

2.3). fusing the left high-resolution image $LI_j$ with the low-resolution color image $CI_j$ of the $j^{th}$ pose, j=1, 2, . . . , m 2.3.1). calculating a projection matrix $H_j$ for registering the low-resolution color image $CI_j$ to the left high-resolution image $LI_j$:

2.3.1.1). respectively extracting SURF feature points from the low-resolution color image $CI_j$ and the left high-resolution image $LI_j$, and taking the extracted SURF feature points as key points;

2.3.1.2). to each key point of the low-resolution color image $CI_j$, finding the closest key point and the next closest key point in the left high-resolution image $LI_j$ according to Euclidean distance, if the ratio of the distance of the closest key point to the distance of the next closet key point is less than a set threshold θ, then determining the closest key point in the left high-resolution image $LI_j$ as the matching point, thus a matching point pair set $C_{cl\_j}$ is obtained;

2.3.1.3). setting a maximum iteration number $K_{p\_reg}$ and an error threshold φ, initializing iteration number k=1, then optimizing the matching point pair set $C_{cl\_j}$ through random sampling consistency (RANSAC) algorithm to obtain the projection matrix $H_j$:

2.3.1.3.1). for the $k^{th}$ iteration in the process of optimizing the matching point pair set $C_{cl\_j}$, randomly selecting four point pairs, which are denoted respectively by $\{q_{cj\_1}, q_{lj\_1}\}$, $\{q_{cj\_2}, q_{lj\_2}\}$, $\{q_{cj\_3}, q_{lj\_3}\}$ and $\{q_{cj\_4}, q_{lj\_4}\}$, and homogenizing them to obtain four point pairs $\{\bar{q}_{cj\_1}, \bar{q}_{lj\_1}\}$, $\{\bar{q}_{cj\_2}, \bar{q}_{lj\_2}\}$, $\{\bar{q}_{cj\_3}, \bar{q}_{lj\_3}\}$ and $\{\bar{q}_{cj\_4}, \bar{q}_{lj\_4}\}$, then calculating a projection matrix $H_{jk}$ between the four point pairs, which satisfies the following relationship:

$\bar{q}_{lj\_i} = H_{jk} \cdot \bar{q}_{cj\_i}$, 1, 2, . . . , 4

2.3.1.3.2). homogenizing a point pair $\{q_{cj\_i}, \bar{q}_{lj\_i}\}$ other than the selected four point pairs from the matching point pair set $C_{cl\_j}$ to obtain point pair $\{\bar{q}_{cj\_i}, \bar{q}_{lj\_i}\}$ then calculating a mapping error $\varepsilon_{jk\_i} = \|\bar{q}_{lj\_i}, H_{jk}\bar{q}_{cj\_i}\|$ according to the projection matrix $H_{jk}$, where i=5, 6, . . . , $N_{cj}$, $N_{cj}$ is the number of point pairs of the matching point pair set $C_{cl\_j}$, and selecting the point pair which mapping error $\varepsilon_{jk\_i} < \varphi$ to form a interior point set $S_{jk}$;

2.3.1.3.3). if the last iteration has been performed, namely k=$K_{p\_reg}$, then comparing $S_{j1}, S_{j2}, \ldots, S_{jK_{p\_reg}}$ to select the projection matrix $H_{jk}$ as the projection matrix $H_j$ when the interior point set $S_{jk}$ is the largest, or k=k+1 and returning step 2.3.1.3.1;

2.3.2). registering the low-resolution color image $CI_j$ to the left high-resolution image $LI_j$ according to the projection matrix $H_j$ to obtain a high-resolution registered color image $CI_{j\_r}$:

2.3.2.1). creating a empty high-resolution registered color image $CI_{j\_r}$ which has the same size with the left high-resolution image $LI_j$, then performing coordinate transformation on the pixels of the low-resolution color image $CI_j$ to obtain a color image $CI_j'$;

2.3.2.2). determining the interpolation range: the pixel points of the high-resolution registered color image $CI_{j\_r}$ which are located on color image $CI_j'$ and other than the matching points in matching point pair set $C_{cl\_j}$ are the points which are needed to be interpolated, namely interpolation points;

2.3.2.3). using the bilinear interpolation method to interpolate the pixel values of all interpolation points: to the $i^{th}$ interpolation point $q_{cj\_r\_i}(x_{cj\_r\_i}, y_{cj\_r\_i})$, performing a inverse transformation according to the projection matrix $H_j$ to obtain a pixel point $\rho_{cj\_i}(x_{cj\_\rho\_i}, y_{cj\_\rho\_i})$ located on the low-resolution color image $CI_j'$, and finding four nearest pixel points which are denoted respectively by $p_{cj\_\rho\_i11}(x_{cj\_\rho\_i1}, y_{cj\_\rho\_i1})$, $p_{cj\_\rho\_i12}(x_{cj\_\rho\_i1}, y_{cj\_\rho\_i2})$, $p_{cj\_\rho\_i21}(x_{cj\_\rho\_i2}, y_{cj\_\rho\_i1})$ and $p_{cj\_\rho\_i22}(x_{cj\_\rho\_i2}, y_{cj\_\rho\_i2})$;

firstly interpolating in the x direction to obtain the following:

$$CI_j(x_{cj\_\rho\_i}, y_{cj\_\rho\_i1}) = \frac{x_{cj\_\rho\_i2} - x_{cj\_\rho\_i}}{x_{cj\_\rho\_i2} - x_{cj\_\rho\_i1}} CI_j(x_{cj\_\rho\_i1}, y_{cj\_\rho\_i1}) + \frac{x_{cj\_\rho\_i} - x_{cj\_\rho\_i1}}{x_{cj\_\rho\_i2} - x_{cj\_\rho\_i1}} CI_j(x_{cj\_\rho\_i2}, y_{cj\_\rho\_i1})$$

$$CI_j(x_{cj\_\rho\_i}, y_{cj\_\rho\_i2}) = \frac{x_{cj\_\rho\_i2} - x_{cj\_\rho\_i}}{x_{cj\_\rho\_i2} - x_{cj\_\rho\_i1}} CI_j(x_{cj\_\rho\_i1}, y_{cj\_\rho\_i2}) + \frac{x_{cj\_\rho\_i} - x_{cj\_\rho\_i1}}{x_{cj\_\rho\_i2} - x_{cj\_\rho\_i1}} CI_j(x_{cj\_\rho\_i2}, y_{cj\_\rho\_i2})$$

then interpolating in the y direction to obtain the following pixel value:

$$CI_j(x_{cj\_\rho\_i}, y_{cj\_\rho\_i}) = \text{Round}\left(\frac{y_{cj\_\rho\_i2} - y_{cj\_\rho\_i}}{y_{cj\_\rho\_i2} - y_{cj\_\rho\_i1}} CI_j(x_{cj\_\rho\_i}, y_{cj\_\rho\_i1}) + \frac{y_{cj\_\rho\_i} - y_{cj\_\rho\_i1}}{y_{cj\_\rho\_i2} - y_{cj\_\rho\_i1}} CI_j(x_{cj\_\rho\_i}, y_{cj\_\rho\_i2})\right)$$

letting the pixel value $CI_{j\_r}(x_{cj\_r\_i}, y_{cj\_r\_i})$ of the interpolation point $q_{cj\_r\_i}(x_{cj\_r\_i}, y_{cj\_r\_i})$ be $CI_j(x_{cj\_\rho\_i}, y_{cj\_\rho\_i})$;

2.3.2.4). to the pixel points of the high-resolution registered color image $CI_{j\_r}$ which are located on color image $CI_j'$ and are the matching points in matching point pair set $C_{cl\_j}$, directly using the pixel values of their corresponding matching point in the low-resolution color image $CI_j$ to assign; and to the pixel points of the high-resolution registered color image $CI_{j\_r}$ which are not located on color image $CI_j'$, directly using preset RGB value to assign, thus the high-resolution registered color image $CI_{j\_r}$ is obtained;

2.3.3). fusing the left high-resolution image $LI_j$ with the high-resolution registered color image $CI_{j\_r}$:

2.3.3.1). performing $N_l$-layer Laplacian pyramid decomposition on the left high-resolution image $LI_j$ to obtain $N_l$ layers of image $LI_{j\_w}$, performing $N_l$-layer Laplacian pyramid decomposition on each channel of the high-resolution registered color image $CI_{j\_r}$ to obtain $N_l$ layers of image $CI_{j\_rw}$ on R channel, $N_l$ layers of image $CI_{j\_gw}$ on G channel and $N_l$ layers of image $CI_{j\_bw}$ on B channel, where w=1, 2, . . . , $N_l$ and represents the serial number of image;

2.3.3.2). respectively performing bilateral filter on the top-layer images $CI_{j\_rN_l}$, $CI_{j\_gN_l}$, $CI_{j\_bN_l}$ and $LI_{j\_N_l}$ to obtain top-layer images $CI_{j\_rN_l\_b}$, $CI_{j\_gN_l\_b}$, $CI_{j\_bN_l\_b}$ and $LI_{j\_N_l\_b}$;

2.3.3.3). to the top-layer images of three channels of the high-resolution registered color image $CI_{j\_r}$, calculating the difference before and after bilateral filtering to obtain detail layer images $CI_{j\_rN_l}'=CI_{j\_rN_l}-CI_{j\_rN_l\_b}$, $CI_{j\_gN_l}'=CI_{j\_gN_l}-CI_{j\_gN_l\_b}$ and $CI_{j\_bN_l}'=CI_{j\_bN_l}-CI_{j\_bN_l\_b}$, which have rich details of image;

2.3.3.4). performing Gaussian filter on the top-layer image of the left high-resolution image $LI_j$ to obtain a overall smooth image $LI_{j\_N_l\_g}$, then calculating the difference between the top-layer image $LI_{j\_N_l\_b}$ and the overall smooth image $LI_{j\_N_l\_g}$ to obtain a layer image $LI_{j\_N_l}'=LI_{j\_N_l\_b}-_{j\_N_l\_g}$ which has rich edge information;

2.3.3.5). calculating top-layer fusion images, where the top-layer fusion image of R channel is: $Fu_{j\_N_l\_r}=CI_{j\_rN_l}+\alpha CI_{j\_rN_l}'+\beta LI_{j\_N_l}'$, the top-layer fusion image of G channel is: $Fu_{j\_N_l\_g}=CI_{j\_gN_l}+\alpha CI_{j\_gN_l}'+\beta LI_{j\_N_l}'$, the top-layer fusion image of B channel is: $Fu_{j\_N_l\_r}=CI_{j\_rN_l}+\alpha CI_{j\_rN_l}'+\beta LI_{j\_N_l}'$;

2.3.3.6). to the layer fusion images other than the top-layer fusion images, for the reason of retaining the rich color information, assigning the layer fusion images of R channel according to equation $Fu_{j\_w\_r}=CI_{j\_rw}$, the layer fusion images of G channel according to equation $Fu_{j\_w\_g}=CI_{j\_gw}$ and the layer fusion images of B channel according to equation $Fu_{j\_w\_b}=CI_{j\_bw}$, where w=1, 2, . . . , $N_l$−1;

2.3.3.7). based on all layer fusion images of each color channel, performing $N_l$-layer Laplacian pyramid composition to obtain fusion images of each color channel, thus the color fusion image of the $j^{th}$ pose is obtained and denoted by $Fu_j$;

2.4). reconstructing a color point cloud:

2.4.1). performing color reconstruction on point cloud of each pose to obtain color point clouds $\tilde{P}_1, \tilde{P}_2, \ldots, \tilde{P}_m$:

2.4.1.1). to each point $p_{ji}(x_{ji}, y_{ji}, z_{ji})$ of the three-dimensional point cloud $P_j$ of the measured high-precision mechanical component of the $j^{th}$ pose, performing a coordinate system conversion from three-dimensional point to pixel point:

$$Z_c \begin{bmatrix} a_{ji} \\ b_{ji} \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R_c & T_c \\ \vec{0} & 1 \end{bmatrix} \begin{bmatrix} x_{ji} \\ y_{ji} \\ z_{ji} \\ 1 \end{bmatrix}$$

where $z_c$ is a scale factor, $f_x$ and $f_y$ are respectively the focal lengths of camera in the x and y direction, $u_0$ and $v_0$ are respectively the coordinates of camera's main point on pixel plane, $R_c$ and $T_c$ are respectively the rotation matrix and the translation vector in camera calibration parameters, $(a_{ji}, b_{ji})$ are the coordinates of the pixel point $q_{ij}$ corresponding to the point $p_{ji}(x_{ji}, y_{ji}, z_{ji})$ of the three-dimensional point cloud $P_j$, i is the serial number of the point;

2.4.1.2). obtaining pixel value $R(a_{ji}, b_{ji})$ of R channel, pixel value $G(a_{ji}, b_{ji})$ of G channel and pixel value $B(a_{ji}, b_{ji})$ of B channel of pixel point at coordinates $(a_{ji}, b_{ji})$ on the color fusion image $Fu_j$, then assigning pixel values to the point $p_{ji}(x_{ji}, y_{ji}, z_{ji})$ of the three-dimensional point cloud $P_j$ according to the following equations: $R(x_{ji}, y_{ji}, z_{ji})=R(a_{ji}, b_{ji})$, $G(x_{ji}, y_{ji}, z_{ji})=G(a_{ji}, b_{ji})$ and $B(x_{ji}, y_{ji}, z_{ji})=B(a_{ji}, b_{ji})$ to obtain color point cloud $\tilde{P}_j$, j=1, 2, . . . , m, where $R(x_{ji}, y_{ji}, z_{ji})$, $G(x_{ji}, y_{ji}, z_{ji})$ and $B(x_{ji}, y_{ji}, z_{ji})$ are respectively the point values of R, G and B channel of point $p_{ji}(x_{ji}, y_{ji}, z_{ji})$ of color point cloud $\tilde{P}_j$;

2.4.2). registering the color point clouds of all poses:

based on the series of rigid body transformation matrices $W_1, W_2, \ldots, W_{m-1}$ which are obtained according to step 2.2, performing registration by respectively converting the color point clouds $\tilde{P}_2, \tilde{P}_3, \ldots, \tilde{P}_m$ to the coordinate system of the color point cloud $\tilde{P}_1$, where the color point clouds after conversion are respectively denoted by $\tilde{P}_2^*, \tilde{P}_3^*, \ldots, \tilde{P}_m^*$, there have:

$$\tilde{P}_2^* = W_1 \tilde{P}_2$$

$$\tilde{P}_3^* = W_1 W_2 \tilde{P}_3$$

$$\ldots$$

$$\tilde{P}_m^* = W_1 W_2 \ldots W_{m-1} \tilde{P}_m$$

2.4.3). fusing the overlapping part of the color point clouds:

setting $\tilde{G}_1^* = \tilde{P}_1^* = \tilde{P}_1$, then fusing the color point cloud $\tilde{P}_2^*$ with the color point cloud $\tilde{G}_1^*$ to obtain a color point cloud $\tilde{G}_2^*$ to j=2, 3, . . . m−1, successively fusing the color point cloud $\tilde{P}_{j+1}^*$ with the color point cloud $\tilde{G}_j^*$ to obtain a color point cloud $\tilde{G}_{j+1}^*$, and finally obtaining a fused overall color point cloud $\tilde{G}_m^*$ that the high-precision true color three dimensional reconstruction is complete;

where the fusion of the color point cloud $\tilde{P}_{j+1}^*$ and the color point cloud $\tilde{G}_j^*$ is:

to the matching point pair in the point-to-point set $C_{j\_key\_k}'$, directly taking it as a correspondence point pair and putting it into a correspondence point pair set $Co_j$;

to a non-matching point $\tilde{p}_{j+1\_i}^*(\tilde{x}_{j+1\_i}^*, \tilde{y}_{j+1\_i}^*, \tilde{z}_{j+1\_i}^*)$ of the color point cloud $\tilde{P}_{j+1}^*$, finding the nearest point in the color point cloud $\tilde{P}_{j+1}^*$ by using KD tree, and then calculating the average value σ of all distances between non-matching points and their respective nearest points; simultaneously, to each non-matching point of the color point cloud $\tilde{G}_j^*$, finding the nearest point in the color point cloud $\tilde{P}_{j+1}^*$ by using KD tree, if the distance of the nearest point is less than the average value σ, then the non-matching point of the color point cloud $\tilde{G}_j^*$ and its nearest point in the color point cloud $\tilde{P}_{j+1}^*$ are taken as a correspondence point pair and put into the correspondence point pair set $Co_j$;

weighting geometric coordinates of each correspondence point pair $\{\tilde{p}_{j+1\_i}^*(\tilde{x}_{j+1\_i}^*, \tilde{y}_{j+1\_i}^*, \tilde{z}_{j+1\_i}^*), \tilde{g}_{j\_i}^*(\tilde{x}_{j\_i}^*,$ $\tilde{y}_{j\_i}{}^*, \tilde{z}_{j\_i}{}^*)\}$ in the correspondence point pair set $Co_j$ with the weights $\alpha_i$ and $\beta_i$ to obtain the coordinates of a fused point $\tilde{g}_{j+1\_i}{}^*$:

$$(\alpha_i\tilde{x}_{j+1\_i}{}^*+\beta_i\tilde{x}_{j\_i}{}^*, \alpha_i\tilde{y}_{j+1\_i}{}^*+\beta_i\tilde{y}_{j\_i}{}^*, \alpha_i\tilde{z}_{j+1\_i}{}^*+\beta_i\tilde{z}_{j\_i}{}^*)$$

respectively weighting the point values of R, G and B channel of each correspondence point pair $\{\tilde{p}_{j+1\_i}{}^*(\tilde{x}_{j+1\_i}{}^*, \tilde{y}_{j+1\_i}{}^*, \tilde{z}_{j+1\_i}{}^*), \tilde{g}_{j\_i}{}^*(\tilde{x}_{j\_i}{}^*, \tilde{y}_{j\_i}{}^*, \tilde{z}_{j\_i}{}^*)\}$ in the correspondence point pair set $Co_j$ with the weights $(\alpha_{ri},\beta_{ri})$, $(\alpha_{gi},\beta_{gi})$ and $(\alpha_{bi},\beta_{bi})$ to obtain the point values $R(\tilde{g}_{j+1\_i}{}^*)$, $G(\tilde{g}_{j+1\_i}{}^*)$ and $B(\tilde{g}_{j+1\_i}{}^*)$ of R, G and B channel of the point $\tilde{g}_{j+1\_i}{}^*$ of the color point cloud $\tilde{G}_{j+1}{}^*$:

$$R(\tilde{g}_{j+1\_i}{}^*)=\alpha_{ri}R(\tilde{p}_{j+1\_i}{}^*)+\beta_{ri}R(\tilde{g}_{j\_i}{}^*)$$

$$G(\tilde{g}_{j+1\_i}{}^*)=\alpha_{gi}G(\tilde{p}_{j+1\_i}{}^*)+\beta_{gi}G(\tilde{g}_{j\_i}{}^*)$$

$$B(\tilde{g}_{j+1\_i}{}^*)=\alpha_{bi}B(\tilde{p}_{j+1\_i}{}^*)+\beta_{bi}B(\tilde{g}_{j\_i}{}^*)$$

where, $i=1, 2, \ldots, N_{coj}$, $N_{coj}$ is the number of the correspondence point pairs, $R(\tilde{p}_{j+1\_i}{}^*)$, $G(\tilde{p}_{j+1\_i}{}^*)$ and $(\tilde{p}_{j+1\_i}{}^*)$ are respectively the point values of R, G and B channel of the point $\tilde{p}_{j+1\_i}{}^*$, $R(\tilde{g}_{j\_i}{}^*)$, $G(\tilde{g}_{j\_i}{}^*)$ and $B(\tilde{g}_{j\_i}{}^*)$ are respectively the point values of R, G and B channel of the point $\tilde{g}_{j\_i}{}^*$ of the color point cloud $\tilde{G}_{j+1}{}^*$.

\* \* \* \* \*